United States Patent
Matskevich et al.

(10) Patent No.: US 10,445,428 B2
(45) Date of Patent: Oct. 15, 2019

(54) INFORMATION OBJECT EXTRACTION USING COMBINATION OF CLASSIFIERS

(71) Applicant: ABBYY Development LLC, Moscow (RU)

(72) Inventors: Stepan Evgenyevich Matskevich, Korolev (RU); Dmitry Andreevich Sukhodolov, Dolgoprudniy (RU); Anatoly Sergeevich Starostin, Moscow (RU)

(73) Assignee: ABBYY Production LLC, Moscow (RU)

( * ) Notice: Subject to any disclaimer, the term of this patent is extended or adjusted under 35 U.S.C. 154(b) by 0 days.

(21) Appl. No.: 15/852,765

(22) Filed: Dec. 22, 2017

(65) Prior Publication Data
US 2019/0179897 A1    Jun. 13, 2019

(30) Foreign Application Priority Data
Dec. 11, 2017 (RU) ................. 2017143154

(51) Int. Cl.
*G06F 17/27* (2006.01)
*G06F 17/24* (2006.01)

(52) U.S. Cl.
CPC ........ *G06F 17/2785* (2013.01); *G06F 17/271* (2013.01); *G06F 17/241* (2013.01)

(58) Field of Classification Search
CPC ...... G06F 17/20; G06F 17/21; G06F 17/2211; G06F 17/227; G06F 17/2282;
(Continued)

(56) References Cited

U.S. PATENT DOCUMENTS 5,963,940 A    10/1999    Liddy et al.
9,672,205 B2    6/2017    Miller
(Continued)

OTHER PUBLICATIONS

Gildea, Daniel and Jurafsky, Daniel, "Automatic Labeling of Semantic Roles", 45 pages, 2002.
Hendrickx, Iris, et al., "SemEval-2010 Task 8: Multi-Way Classification of Semantic Relations Between Pairs of Nominals", 6 pages, 2010.

*Primary Examiner* — Leshui Zhang
(74) *Attorney, Agent, or Firm* — Lowenstein Sandler LLP

(57) ABSTRACT

Systems and methods for information extraction from natural language texts using a combination of classifier models. An example method may comprise: producing, by performing syntactico-semantic analysis of a natural language text, a plurality of syntactico-semantic structures representing the natural language text; identifying, using a first classifier model to process a first plurality of classification attributes derived from the syntactico-semantic structures, a plurality of core constituents, such that each core constituent of the plurality of core constituents is associated with a span of a plurality of spans, wherein each span represents an attribute of an information object of a specified ontology class; identifying, using a second classifier model to process a second plurality of classification attributes derived from the syntactico-semantic structures, child constituents of each of the plurality of core constituents; and determining, using a third classifier model to process a third plurality of classification attributes derived from the syntactico-semantic structures, whether a first span of the plurality of spans and a second span of the plurality of spans represent information object attributes that are associated with a same information object.

20 Claims, 19 Drawing Sheets

(58) Field of Classification Search
CPC ...... G06F 17/25; G06F 17/27; G06F 17/2705;
G06F 17/271; G06F 17/274; G06F
17/2755; G06F 17/2765; G06F 17/277;
G06F 17/2775; G06F 17/2785; G06F
17/2795; G06F 17/28; G06F 17/2863;
G06F 17/24; G06F 17/241; G06F 17/15;
G06F 17/153; G06F 17/16; G06F 17/18;
G06F 17/22; G06F 17/2229; G06F
17/2247
USPC ......... 704/4, 8, 9, 200, 200.1, 202, E17.005,
704/E15.024, E15.021, E15.022, E15.023
See application file for complete search history.

(56) References Cited

U.S. PATENT DOCUMENTS

| | | | |
|---|---|---|---|
| 2005/0075859 A1* | 4/2005 | Ramsey | G06F 17/2715 704/9 |
| 2015/0199333 A1* | 7/2015 | Nekhay | G06F 17/278 704/9 |
| 2016/0140104 A1 | 5/2016 | Miller | |
| 2016/0147736 A1* | 5/2016 | Danielyan | G06F 17/2785 704/9 |

* cited by examiner

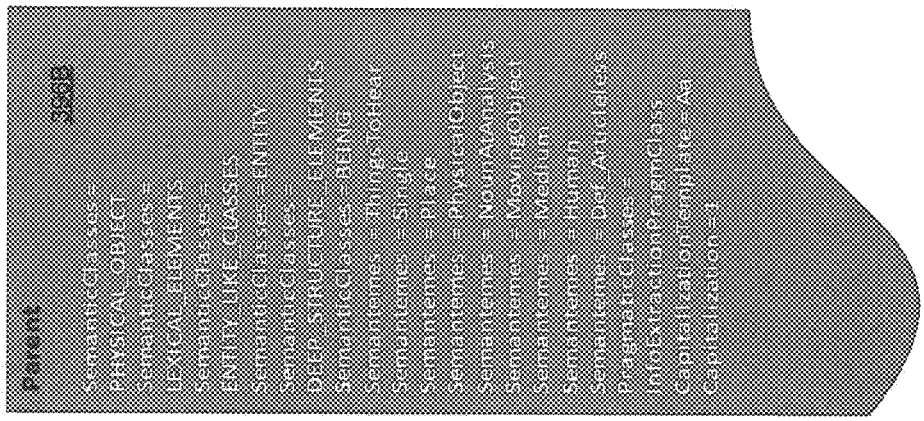
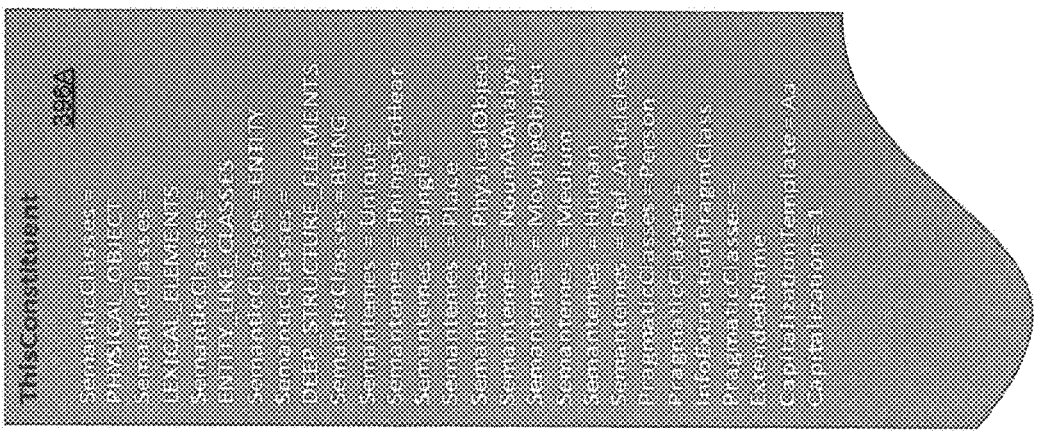
Fig. 3B

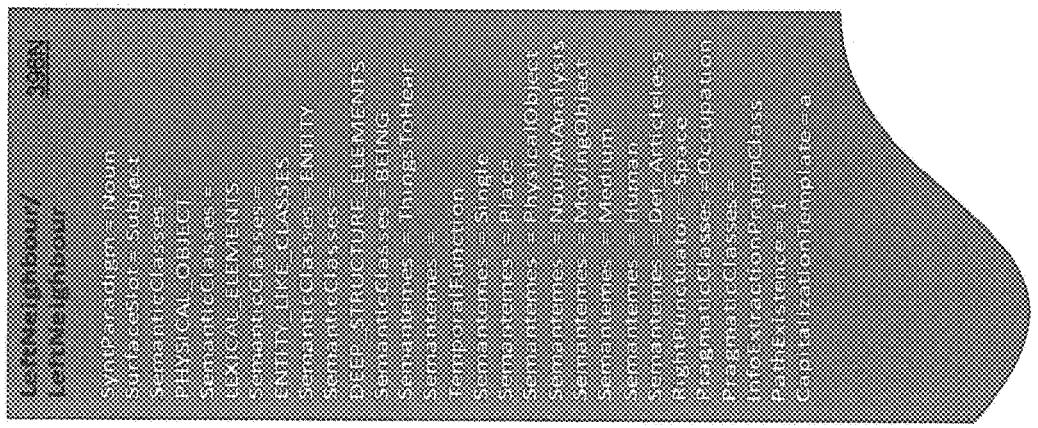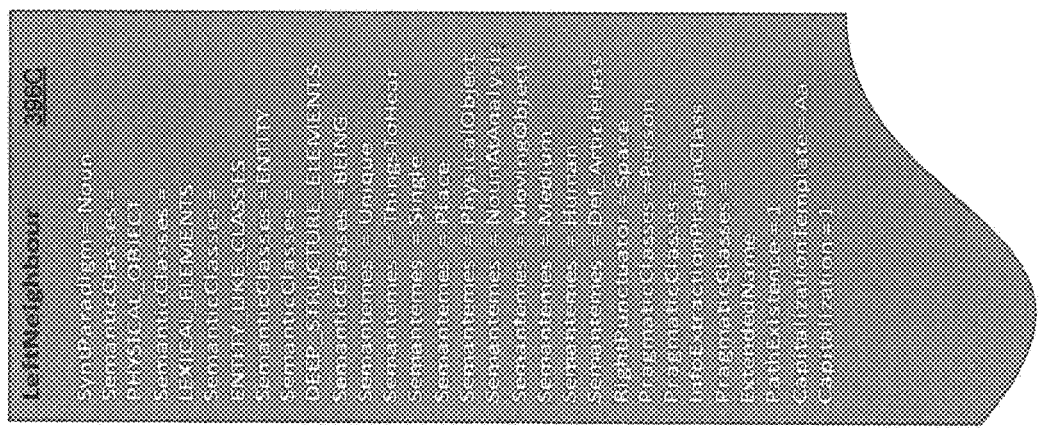
Fig. 3C

```
ThisConstituent#SemanticClasses = BEING
ThisConstituent#Semantemes = Medium
ThisConstituent#Semantemes = MovingObject
ThisConstituent#SemanticClasses = PHYSICAL_OBJECT
LeftBounding#Semantemes = Medium
LeftBounding#SemanticClasses = BEING
LeftBounding#Semantemes = MovingObject
RightBounding#SemanticClasses = BEING
RightBounding#Semantemes = Medium
LeftBounding#Semantemes = Def_Articleless
RightBounding#Semantemes = MovingObject
LeftBounding#Semantemes = Single
LeftBounding#Semantemes = ThingsToHear
ThisConstituent#Semantemes = Def_Articleless
ThisConstituent#Semantemes = Human
LeftBounding#SemanticClasses = PHYSICAL_OBJECT
LeftBounding#Semantemes = Human
RightBounding#SemanticClasses = PHYSICAL_OBJECT
LeftBounding#Semantemes = PhysicalObject
ThisConstituent#Semantemes = ThingsToHear
ThisConstituent#Semantemes = PhysicalObject
RightBounding#Semantemes = Human
ThisConstituent#Capitalization = 1
RightBounding#Semantemes = Def_Articleless
RightBounding#Semantemes = ThingsToHear
ThisConstituent#PragmaticClasses = ExtendedName
ThisConstituent#PragmaticClasses = Person
ThisConstituent#Semantemes = Unique
ThisConstituent#CapitalizationTemplate = Aa
RightBounding#Semantemes = PhysicalObject
RightBounding#Capitalization = 1
```

INFORMATION OBJECT EXTRACTION USING COMBINATION OF CLASSIFIERS

REFERENCE TO RELATED APPLICATIONS

The present application claims the benefit of priority under 35 U.S.C. § 119 to Russian Patent Application No. 2017143154 filed Dec. 11, 2017, the disclosure of which is incorporated herein by reference in its entirety for all purposes.

TECHNICAL FIELD

The present disclosure is generally related to computer systems, and is more specifically related to systems and methods for natural language processing.

BACKGROUND

Information extraction may involve analyzing a natural language text to recognize information objects, such as named entities, and relationships between the recognized information objects.

SUMMARY OF THE DISCLOSURE

In accordance with one or more aspects of the present disclosure, an example method for information extraction from natural language texts using a combination of classifier models may comprise: producing, by a computer system performing syntactico-semantic analysis of a natural language text, a plurality of syntactico-semantic structures representing the natural language text; identifying, using a first classifier model to process a first plurality of classification attributes derived from the syntactico-semantic structures, a plurality of core constituents, such that each core constituent of the plurality of core constituents is associated with a span of a plurality of spans, wherein each span represents an attribute of an information object of a specified ontology class; identifying, using a second classifier model to process a second plurality of classification attributes derived from the syntactico-semantic structures, child constituents of each of the plurality of core constituents; and determining, using a third classifier model to process a third plurality of classification attributes derived from the syntactico-semantic structures, whether a first span of the plurality of spans and a second span of the plurality of spans represent information object attributes that are associated with a same information object.

In accordance with one or more aspects of the present disclosure, an example system for information extraction from natural language texts using a combination of classifier models may comprise a memory and a processor coupled to the memory, the processor configured to: produce, by performing syntactico-semantic analysis of a natural language text, a plurality of syntactico-semantic structures representing the natural language text; identify, using a first classifier model to process a first plurality of classification attributes derived from the syntactico-semantic structures, a plurality of core constituents, such that each core constituent of the plurality of core constituents is associated with a span of a plurality of spans, wherein each span represents an attribute of an information object of a specified ontology class; identify, using a second classifier model to process a second plurality of classification attributes derived from the syntactico-semantic structures, child constituents of each of the plurality of core constituents; and determine, using a third classifier model to process a third plurality of classification attributes derived from the syntactico-semantic structures, whether a first span of the plurality of spans and a second span of the plurality of spans represent information object attributes that are associated with a same information object.

In accordance with one or more aspects of the present disclosure, an example computer-readable non-transitory storage medium may comprise executable instructions that, when executed by a computer system, cause the computer system to: produce, by performing syntactico-semantic analysis of a natural language text, a plurality of syntactico-semantic structures representing the natural language text; identify, using a first classifier model to process a first plurality of classification attributes derived from the syntactico-semantic structures, a plurality of core constituents, such that each core constituent of the plurality of core constituents is associated with a span of a plurality of spans, wherein each span represents an attribute of an information object of a specified ontology class; identify, using a second classifier model to process a second plurality of classification attributes derived from the syntactico-semantic structures, child constituents of each of the plurality of core constituents; and determine, using a third classifier model to process a third plurality of classification attributes derived from the syntactico-semantic structures, whether a first span of the plurality of spans and a second span of the plurality of spans represent information object attributes that are associated with a same information object.

BRIEF DESCRIPTION OF THE DRAWINGS

The present disclosure is illustrated by way of examples, and not by way of limitation, and may be more fully understood with references to the following detailed description when considered in connection with the figures, in which:

FIGS. 3A-3C schematically illustrate an example set of attributes associated with an example named entity referenced by an example natural language sentence, in accordance with one or more aspects of the present disclosure;

FIG. 4 schematically illustrates a vector representing a set of attributes of a given constituent and its neighboring nodes, in accordance with one or more aspects of the present disclosure;

FIG. 7 schematically illustrates an example of a lexico-morphological structure of a sentence, in accordance with one or more aspects of the present disclosure;

DETAILED DESCRIPTION

Figure 1:
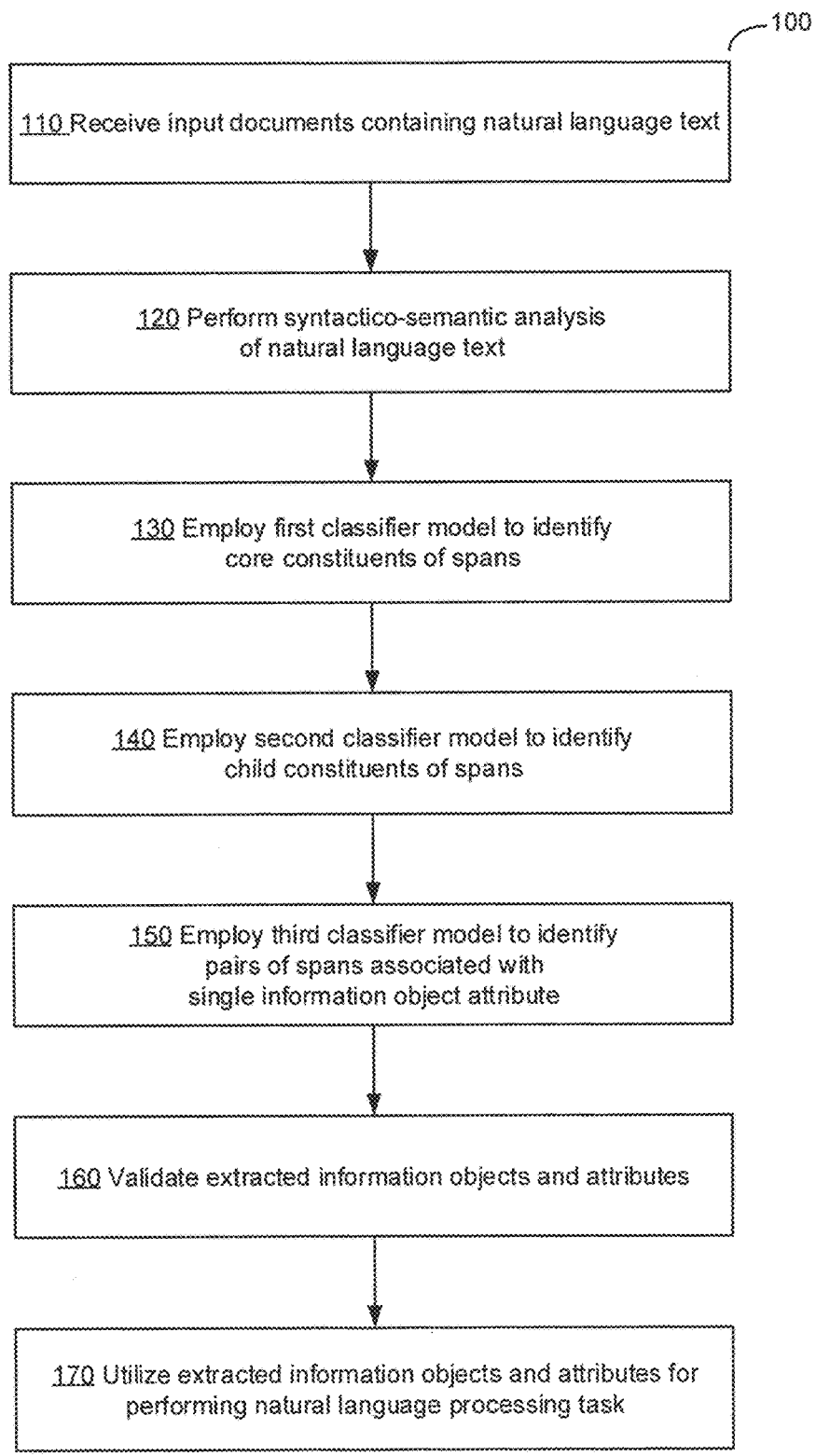
FIG. 1 depicts a flow diagram of an example method for information extraction from natural language texts using a combination of classifiers, in accordance with one or more aspects of the present disclosure.

Described herein are methods and systems for information extraction from natural language texts using a combination of classifier models. A classifier model (also referred to herein as classifier) may be represented by a mathematical function that yields a degree of association of an object with a category of a pre-defined set of categories. The classifier domain may be represented by a hyperspace of attributes of the objects being classified. One or more parameters of the classifier may be determined by the supervised learning process, which involves processing a training data set that includes object instances with known associated categories.

Examples of information extraction include entity extraction and fact extraction. Named entity recognition (NER) is an information extraction task that locates and classifies groups of one or more natural language text words into pre-defined categories such as names of persons, organizations, locations, expressions of times, quantities, monetary values, percentages, etc. "Fact extraction" is an information extraction task that identifies relationships between extracted information objects (entities). Examples of such relationships include employment of a person X by an organizational entity Y, location of an object A in a geolocation B, acquiring an organizational entity M by an organizational entity N, etc. The systems and methods described herein may be employed in a wide variety of natural language processing applications, including machine translation, semantic indexing, semantic search (including multi-lingual semantic search), document classification, e-discovery, etc.

An information object may represent a real life object (such as a person or a thing) and/or certain characteristics associated with one or more real life objects (such as a quantifiable attribute or a quality). The extracted named entities, other information objects, and their relationships may be represented by concepts of a pre-defined or dynamically built ontology. "Ontology" herein shall refer to a hierarchical model representing concepts (i.e., classes of information objects, referred to herein as "ontology classes") pertaining to a certain branch of knowledge (subject area) and relationships among such concepts and/or associated information objects. The ontology may further specify certain attributes associated with each concept or associated information objects.

In accordance with one more aspects of the present disclosure, extracting information from a natural language text may involve employing a combination of classifiers for identifying a plurality of spans, i.e. fragments of the text including information objects in a set of syntactico-semantic structures representing the natural language text. Each span may be represented by a set of syntactico-semantic structure nodes, including the core constituent and a subset of its immediate child constituents, such that the set of nodes is associated with a continuous text fragment, also referred to herein as the projection of the span. The span projection may include one or more natural language words representing a textual annotation of an information object attribute. The span projection may be specified by its position in the text, including the starting position and the ending position.

The first classifier of the combination of classifiers may be employed to analyze the semantico-syntactic structure representing the natural language text in order to identify core constituents of spans representing attributes of information objects of a certain ontology class (e.g., a person). The second classifier of the combination of classifier may be employed to analyze the semantico-syntactic structure in order to identify child constituents contained by the spans associated with the identified core constituents. The third classifier of the combination of classifiers may be employed to analyze the semantico-syntactic structure in order to determine whether a pair of identified spans represents object attributes of the same information object, as described in more detail herein below.

Systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in detail herein below by way of examples, rather than by way of limitation.

FIG. 1 depicts a flow diagram of an example method for information extraction from natural language texts using a combination of classifiers, in accordance with one or more aspects of the present disclosure. Method 100 and/or each of its individual functions, routines, subroutines, or operations may be performed by one or more processors of the computer system (e.g., computer system 1000 of FIG. 17) implementing the method. In certain implementations, method 100 may be performed by a single processing thread. Alternatively, method 100 may be performed by two or more processing threads, each thread implementing one or more individual functions, routines, subroutines, or operations of the method. In an illustrative example, the processing threads implementing method 100 may be synchronized (e.g., using semaphores, critical sections, and/or other thread synchronization mechanisms). Alternatively, the processing threads implementing method 100 may be executed asynchronously with respect to each other. Therefore, while FIG. 1 and the associated description lists the operations of method 100 in certain order, various implementations of the method may perform at least some of the described operations in parallel and/or in arbitrary selected orders.

At block 110, the computer system implementing method 100 may receive one or more input documents containing a natural language text. In various illustrative examples, the natural language text to be processed by method 100 may be retrieved from one or more electronic documents which may be produced by scanning or otherwise acquiring images of paper documents and performing optical character recognition (OCR) to produce the natural language texts. The natural language text may be also retrieved from various other sources including electronic mail messages, social networks, audio files processed by speech recognition methods, etc.

At block 120, the computer system may perform a syntactico-semantic analysis of the natural language text. The syntactico-semantic analysis may involve performing, for sentence of the text, lexico-morphological analysis, followed by rough syntactic analysis and precise syntactic analysis, and processing the resulting syntactic trees in to order produce a syntactico-semantic structure corresponding to the sentence, as described in more detail herein below with references to FIGS. 6-16. Each syntactico-semantic structure yielded by the syntactico-semantic analysis may be represented by an acyclic graph that includes a plurality of nodes corresponding to ontology classes and a plurality of edges corresponding to semantic relationships.

At block 130, the computer system may employ a first classifier model to identify, in the set of syntactico-semantic structures representing the natural language text, core constituents of spans representing certain attributes of information objects of a specified ontology class. For a given candidate node of the syntactico-semantic structure, the first classifier model may yield a value representing the likelihood of the candidate node representing a core constituent of a span that represents an attribute of an information object of the specified ontology class.

In an illustrative example, the computer system may traverse the set of syntactico-semantic structures representing the natural language text and apply the first classifier model to at least some nodes of the syntactico-semantic structures to determine the respective likelihoods of each node representing a core constituent of a span that represents an attribute of an information object of the specified ontology class. Candidate core constituents having respective likelihood values exceeding a threshold value may be classified as core constituents of such spans.

In various illustrative examples, the first classifier model may be implemented by a gradient boosting classifier, random forest classifier, support vector machine (SVM) classifier, and/or other suitable automatic classification methods. Classification attributes for the first classifier model may include at least a subset of attributes of the candidate core constituent and its neighboring nodes, including the parent, child, and/or sibling nodes of the candidate core constituent. The attributes may include grammemes, semantemes, surface models, deep models, semantic and lexical classes, etc. The first classifier model may be trained on an annotated text corpus, as described in more detail herein below.

At block 140, the computer system may employ a second classifier model to identify, in the set of syntactico-semantic structures representing the natural language text, child constituents of the identified core constituents of spans that represent attributes of information objects of the specified ontology class, such that the identified child constituents belong to the respective spans corresponding to the identified core constituents. For a given candidate child constituent, the second classifier model may yield a value representing the likelihood of the candidate child constituent belonging to a span associated with a core constituent of the set of identified core constituents.

In an illustrative example, the computer system may iterate through the identified core constituents and, for each core constituent, apply the second classifier model to at least some of its immediate child constituents, in order to determine the respective likelihoods of each candidate child constituent belonging to a span associated with the core constituent. Candidate child constituents having the respective likelihood values exceeding a threshold value may be classified as child constituents of such spans.

In various illustrative examples, the second classifier model may be implemented by a gradient boosting classifier, decision forest classifier, SVM classifier, and/or other suitable automatic classification methods. Classification attributes for the second classifier model may include at least a subset of attributes of the candidate child constituent and its neighboring nodes, including parent, child, and/or sibling nodes of the candidate child constituents. The attributes may include grammemes, semantemes, surface models, deep models, semantic and lexical classes, etc. The second classifier model may be trained on an annotated text corpus, as described in more detail herein below.

At block 150, the computer system may employ a third classifier to analyze at least a subset of all possible pairs of identified spans, and for each pair of spans determine whether the information object attributes represented by the pair of spans are associated with the same information object. For a given candidate pair of spans, the third classifier model may yield a value representing the likelihood of the candidate pair of spans associated with the same information object.

In an illustrative example, the computer system may iterate through at least a subset of all possible pairs of identified spans and, for each candidate pair of spans, apply the third classifier model, in order to determine the likelihood of the candidate pair of spans being associated with the same information object. Candidate pair of spans having the respective likelihood values exceeding a threshold value may be classified as being associated with the same information object.

While the third classifier identifies pairs of spans, a group of spans associated with the same information object may include more than two spans. Accordingly, the computer system performing the information extraction may process the results produced by the third classifier in order to identify groups of associated spans. In certain implementations, the computer system may produce a graph whose vertices represent the spans produced by the combination of first and second classifiers. The computer system may then connect the pairs of vertices which have been found, by the third classifier, to be associated with the same information objects. Finally, the computer system may identify, in the graph, a plurality of connected components, such that each connected component is represented by two or more vertices connected by edges. Each connected component represents a plurality of spans corresponding to one or more information object attributes of the same information objects.

In various illustrative examples, the third classifier model may be implemented by a gradient boosting classifier, random forest classifier, SVM classifier, and/or other suitable automatic classification methods. Classification attributes for the third classifier model may include at least a subset of attributes of the candidate pair of spans, including the core constituents, the child constituents, and/or their sibling nodes. The attributes may include grammemes, semantemes, surface models, deep models, semantic and lexical classes, etc. The third classifier model may be trained on an annotated text corpus, as described in more detail herein below.

In certain implementations, classification attributes for the third classifier model may be represented by concatenation of two or more of attribute vectors, such that each attribute vector includes at least a subset of attributes of certain constituents of the first or the second span of the candidate pair of spans. In an illustrative example, the vector of classification attributes may include at least a subset of attributes of the core constituent of the first span of the candidate pair of spans and/or at least a subset of attributes of the core constituent of the second span of the candidate pair of spans. In another illustrative example, the vector of classification attributes may include at least a subset of attributes of a node which is a common ancestor of the core constituents of the first and second spans of the candidate pair of spans. In another illustrative example, the vector of classification attributes may include at least a subset of attributes of nodes on the path from the core constituent of the first span to the common ancestor of the core constituents of the first and second spans. In another illustrative example, the vector of classification attributes may include at least a subset of attributes of nodes on the path from the core constituent of the second span to the common ancestor of the core constituents of the first and second spans.

In certain implementations, the vector of classification attributes may include one or more specially defined attributes. In an illustrative example, the vector of classification attributes may include the types of the first and second span. In another illustrative example, the vector of classification attributes may include a value reflecting the relationships of the span core constituents in the semantic structure, e.g., the common core constituent, the core constituent of the first span is a descendant of the core constituent of the second span or vice versa, or the core constituent of the first and second spans have a common ancestor. In another illustrative example, the vector of classification attributes may include a value reflecting the number of nodes on the path from the core constituent of the first span to the common ancestor of the core constituents of the first and second spans. In another illustrative example, the vector of classification attributes may include a value reflecting the number of nodes on the path from the core constituent of the second span to the common ancestor of the core constituents of the first and second spans. In another illustrative example, the vector of classification attributes may include a value reflecting the distance between the core constituents of the first and second spans in the syntactico-semantic structure. In another illustrative example, the vector of classification attributes may include a value reflecting the number of spans of certain types located between the first and the second span in the syntactico-semantic structure, such that those types may be associated with the information object characterized by the first and second spans.

In certain implementations, the computer system may represent the extracted information objects and their attributes by an (Resource Definition Framework) RDF graph. The Resource Definition Framework assigns a unique identifier to each information object and stores the information regarding such an object in the form of SPO triplets, where S stands for "subject" and contains the identifier of the object, P stands for "predicate" and identifies an attribute of the object, and O stands for "object" and stores the attribute value. This value can be either a primitive data type (string, number, Boolean value) or an identifier of another object. In an illustrative example, an SPO triplet may associate a natural language text fragment with a category of named entities.

At block 160, which may be omitted from certain implementations of the method (as indicated by the dashed line), the computer system may display the extracted information objects and their attributes in visual association with the respective textual annotations represented by projections of the identified spans. The computer system may further accept the user input confirming or modifying the extracted information objects and/or their attributes. In certain implementations, the user input may be utilized for updating the training data set that is employed for adjusting parameters of the classifier models utilized for identifying core constituents of spans representing certain attributes of information objects of a specified semantic class, child constituents belonging to the identified spans, and pairs of spans representing information object attributes associated with a single information object.

At block 170, the computer system may utilize the extracted information objects and their attributes for performing various natural language processing tasks, such as machine translation, semantic search, document classification, clustering, text filtering, etc. Responsive to completing the operations described with references to block 160, the method may terminate.

Figure 2:
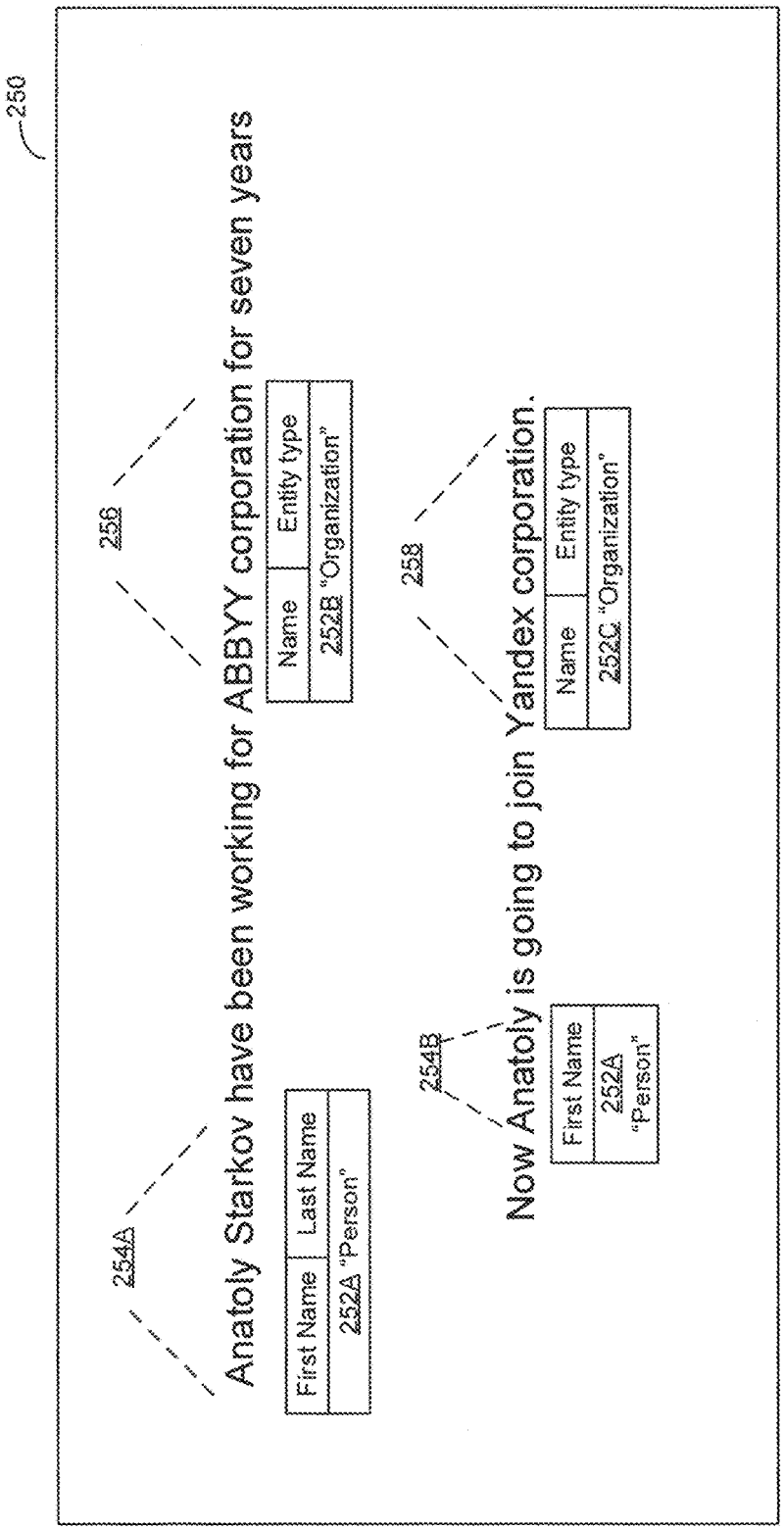
FIG. 2 schematically represents an example text fragment which may processed by the systems and methods described herein.

FIG. 2 illustrates an example natural language text which may be processed by the systems and method of the present disclosure. As schematically illustrated by FIG. 2, the example text 200 may include three named entities 252A-252C, such that the named entity 252A is referenced by two separate text fragments 254A and 254B, while the named entities 252B-252C are each referenced by respective text fragments 256 and 258.

As noted herein above, classification attributes for the classifier models may include at least a subset of attributes of the candidate constituent and its neighboring nodes, including the parent, child, and/or sibling nodes of the candidate constituent. The attributes may include semantic class identifiers, lexical class identifiers, pragmatic class identifiers, syntactic paradigm identifiers, grammeme identifiers, semanteme identifiers, capitalization patterns, deep lost identifiers, identifiers of the left and/or right punctuator, presence of a specified context, etc. In certain implementations, the initial set of classification attributes may be processed in order to identify a subset of the most informative attributes, based on one or more statistical criteria which evaluate the ability of a classifier model to produce the most number of correct outputs based on the subset of attributes being evaluated.

Figure 3A:
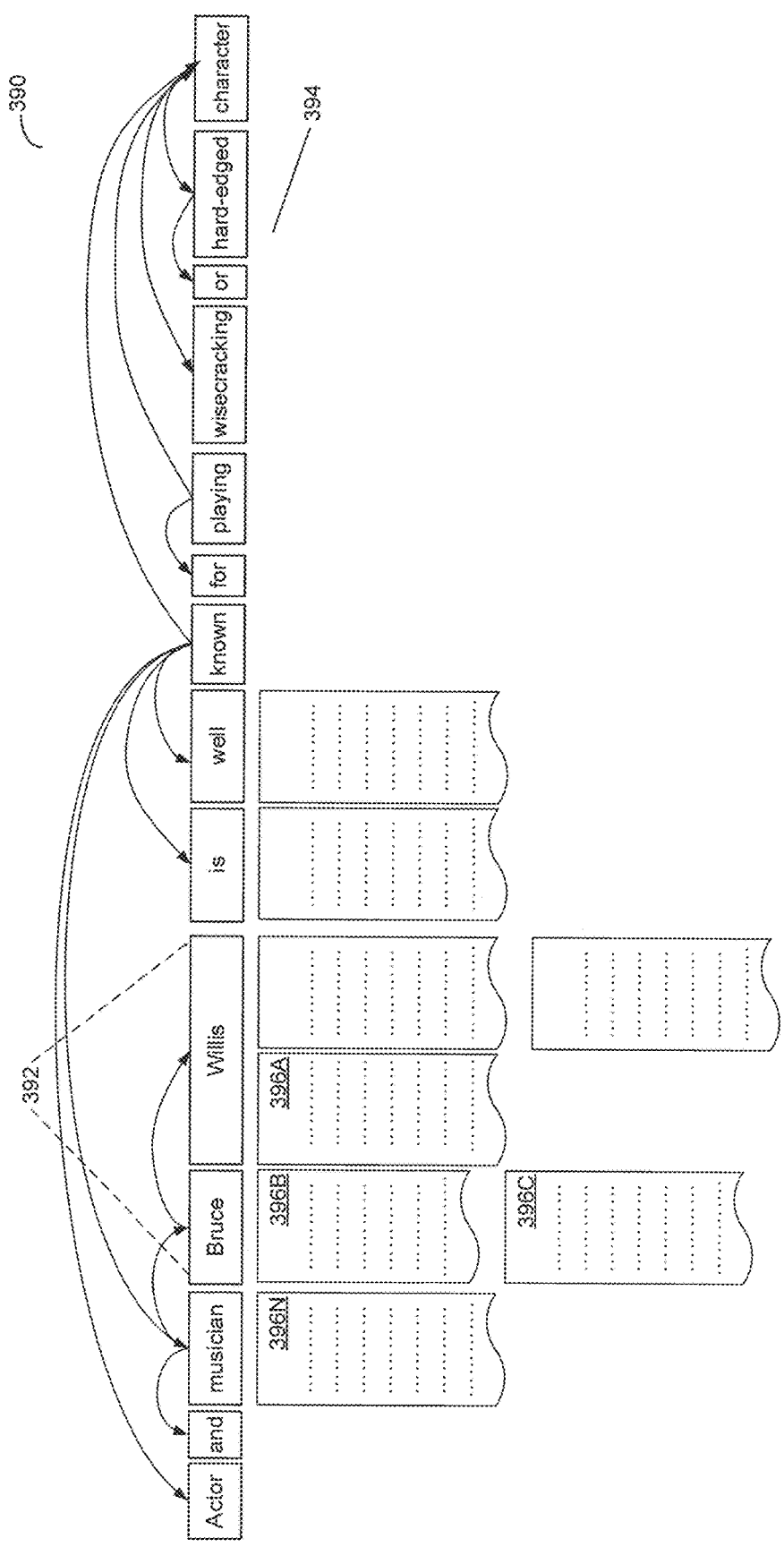

FIGS. 3A-3C schematically illustrate an example set of attributes 390 associated with the example named entity 392 referenced by the example natural language sentence 394. As shown in FIG. 3A, the set of attributes associated with the example named entity 392 may include sets of attributes 396A-396N which are associated with the core constituent and its neighboring nodes, e.g., the parent, the left neighbor, the left neighbor of the left neighbor, etc. FIG. 3B schematically illustrates sets of attributes 396A and 396B which are associated, respectively, with the core constituent and its parent node. FIG. 3C schematically illustrates sets of attributes 396C and 396N which are associated, respectively, with the left neighbor of the core constituent and the left neighbor of the left neighbor of the core constituent.

Thus, determining a set of attributes for a given constituent may involve traversing, according to a pre-defined traversal path, the syntactico-semantic structure representing at least a piece of the natural language text. The traversal path may specify the neighboring nodes of the given constituent whose attributes should be included into the set of attributes for the given constituent, as well as the order of traversal of the neighboring nodes. In an illustrative example, the neighboring nodes may include the parent constituent, the child constituent associated with the given constituent by the specified deep slot, the left and/or right siblings of the given constituent, the left and/or right bounding of the given constituent, and the left and/or right neighbor of the given constituent. For every node on the path, each attribute and its value may be encoded by a <"name"="value"> pair, in which the "name" is represented by a concatenation of a character string identifying the constituent and a character string identifying the attribute type, and the "value" is represented by the value of the identified attribute. As schematically illustrated by FIG. 4, the set of attributes 400 representing a given constituent and its neighboring nodes may be represented by a vector of such <"name"="value"> pairs.

As noted herein above, values of one or more classifier parameters may be determined by a supervised learning method. The supervise learning may involve iteratively modifying the parameter values based on processing a training data set including a plurality of annotated natural language texts, in order to optimize a fitness function reflecting the ratio of the number of information objects in the natural language texts of the training data set that would be classified correctly using the specified values of the classifier parameters to the total number of information objects in the natural language texts in the training data set.

The training data set may be produced by processing one or more annotated natural language texts. An annotated text may include a plurality of annotations, such that each annotation specifies a contiguous text fragment and the types of information object and/or object attributes represented by the text fragment.

In particular, for the first classifier that identifies the core constituents of spans representing attributes of information objects of a certain ontology class, the training data set may include positive examples of constituents that represent cores of spans representing attributes of information objects and/or negative examples of constituents that do not represent cores of such spans. For the second classifier that identifies child constituents of the spans associated with the identified core constituents, the training data set may include positive examples of child constituents of cores of spans representing attributes of information objects and/or negative examples of constituents that are not child constituents of cores of spans. For the third classifier that identifies determines whether a pair of identified spans represents object attributes of the same information object, the training data set may include positive examples of pairs of spans which represent attributes of the same information object.

The training data sets may include various attributes of the respective constituents, including semantic class identifiers, lexical class identifiers, pragmatic class identifiers, syntactic paradigm identifiers, grammeme identifiers, semanteme identifiers, capitalization patterns, deep slot identifiers, identifiers of the left and/or right punctuator, presence of a specified context, etc. The attributes may be represented by "name=value" vectors as described in more detail herein above.

Extracting one or more spans from an annotated text fragment may involve identifying one or more syntactico-semantic subtrees, such that their core constituents are located within the annotated fragment, while their parent constituents are located outside of the annotated fragment. Each identified subtree corresponds to a span. Each produced span may be expanded to include one or more immediate child constituents of its core constituent, if such child constituents are located within the annotated natural text fragment.

Figure 5:
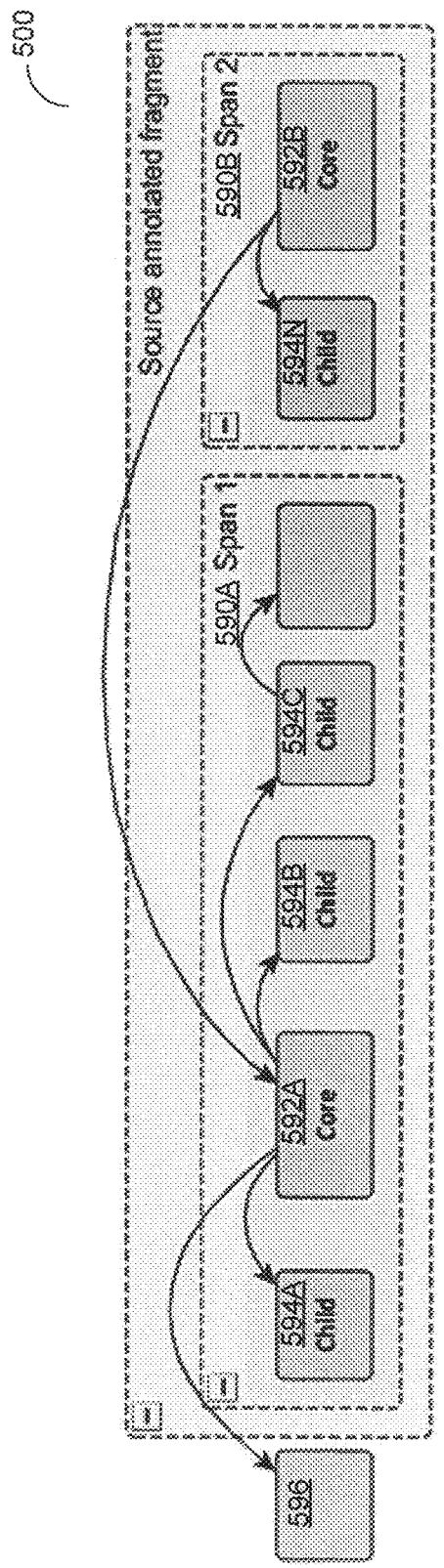
FIG. 5 schematically illustrates extraction of spans from an annotated natural language text, in accordance with one or more aspects of the present disclosure.

FIG. 5 schematically illustrates an example of extraction of spans from an annotated natural language text, in accordance with one or more aspects of the present disclosure. As shown in FIG. 5, the example of the annotated text fragment 500 includes the spans 590A and 590B. Each span may include the respective core constituent, e.g. 592A and 592B accordingly, and a respective subset of immediate child constituents 594A-594N which are located within the annotated fragment 500. Child constituents 596 which are located outside of the annotated fragment 500 are excluded from the span.

Figure 6:
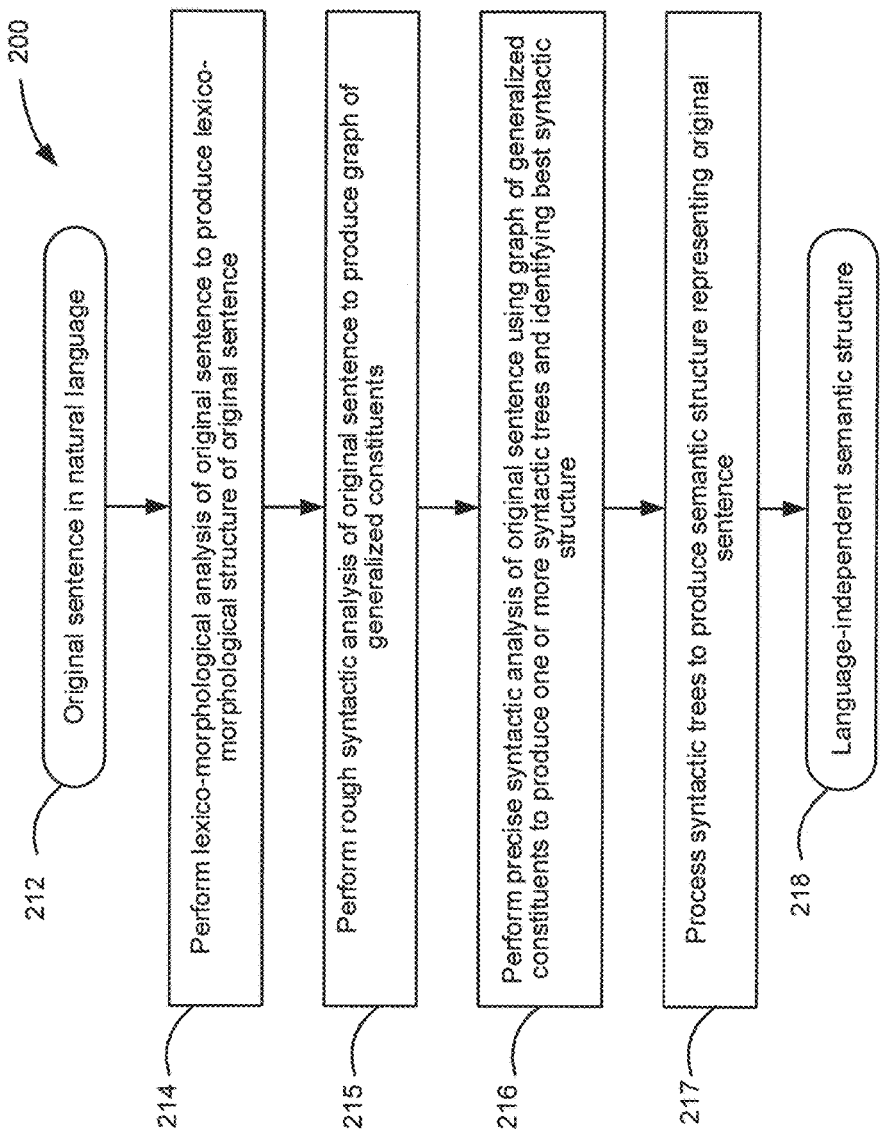
FIG. 6 depicts a flow diagram of one illustrative example of a method for performing a semantico-syntactic analysis of a natural language sentence, in accordance with one or more aspects of the present disclosure.

FIG. 6 depicts a flow diagram of one illustrative example of a method 200 for performing a semantico-syntactic analysis of a natural language sentence 212, in accordance with one or more aspects of the present disclosure. Method 200 may be applied to one or more syntactic units (e.g., sentences) comprised by a certain text corpus, in order to produce a plurality of semantico-syntactic trees corresponding to the syntactic units. In various illustrative examples, the natural language sentences to be processed by method 200 may be retrieved from one or more electronic documents which may be produced by scanning or otherwise acquiring images of paper documents and performing optical character recognition (OCR) to produce the texts associated with the documents. The natural language sentences may be also retrieved from various other sources including electronic mail messages, social networks, digital content files processed by speech recognition methods, etc.

At block 214, the computer system implementing the method may perform lexico-morphological analysis of sentence 212 to identify morphological meanings of the words comprised by the sentence. "Morphological meaning" of a word herein shall refer to one or more lemmas (i.e., canonical or dictionary forms) corresponding to the word and a corresponding set of values of grammatical attributes defining the grammatical value of the word. Such grammatical attributes may include the lexical category of the word and one or more morphological attributes (e.g., grammatical case, gender, number, conjugation type, etc.). Due to homonymy and/or coinciding grammatical forms corresponding to different lexico-morphological meanings of a certain word, two or more morphological meanings may be identified for a given word. An illustrative example of performing lexico-morphological analysis of a sentence is described in more detail herein below with references to FIG. 7.

At block 215, the computer system may perform a rough syntactic analysis of sentence 212. The rough syntactic analysis may include identification of one or more syntactic models which may be associated with sentence 212 followed by identification of the surface (i.e., syntactic) associations within sentence 212, in order to produce a graph of generalized constituents. "Constituent" herein shall refer to a contiguous group of words of the original sentence, which behaves as a single grammatical entity. A constituent comprises a core represented by one or more words, and may further comprise one or more child constituents at lower levels. A child constituent is a dependent constituent and may be associated with one or more parent constituents.

At block 216, the computer system may perform a precise syntactic analysis of sentence 212, to produce one or more syntactic trees of the sentence. The pluralism of possible syntactic trees corresponding to a given original sentence may stem from homonymy and/or coinciding grammatical forms corresponding to different lexico-morphological meanings of one or more words within the original sentence. Among the multiple syntactic trees, one or more best syntactic trees corresponding to sentence 212 may be selected, based on a certain quality metric function taking into account compatibility of lexical meanings of the original sentence words, surface relationships, deep relationships, etc.

At block 217, the computer system may process the syntactic trees to produce a semantic structure 218 corresponding to sentence 212. Semantic structure 218 may comprise a plurality of nodes corresponding to semantic classes, and may further comprise a plurality of edges corresponding to semantic relationships, as described in more detail herein below.

Figure 7:
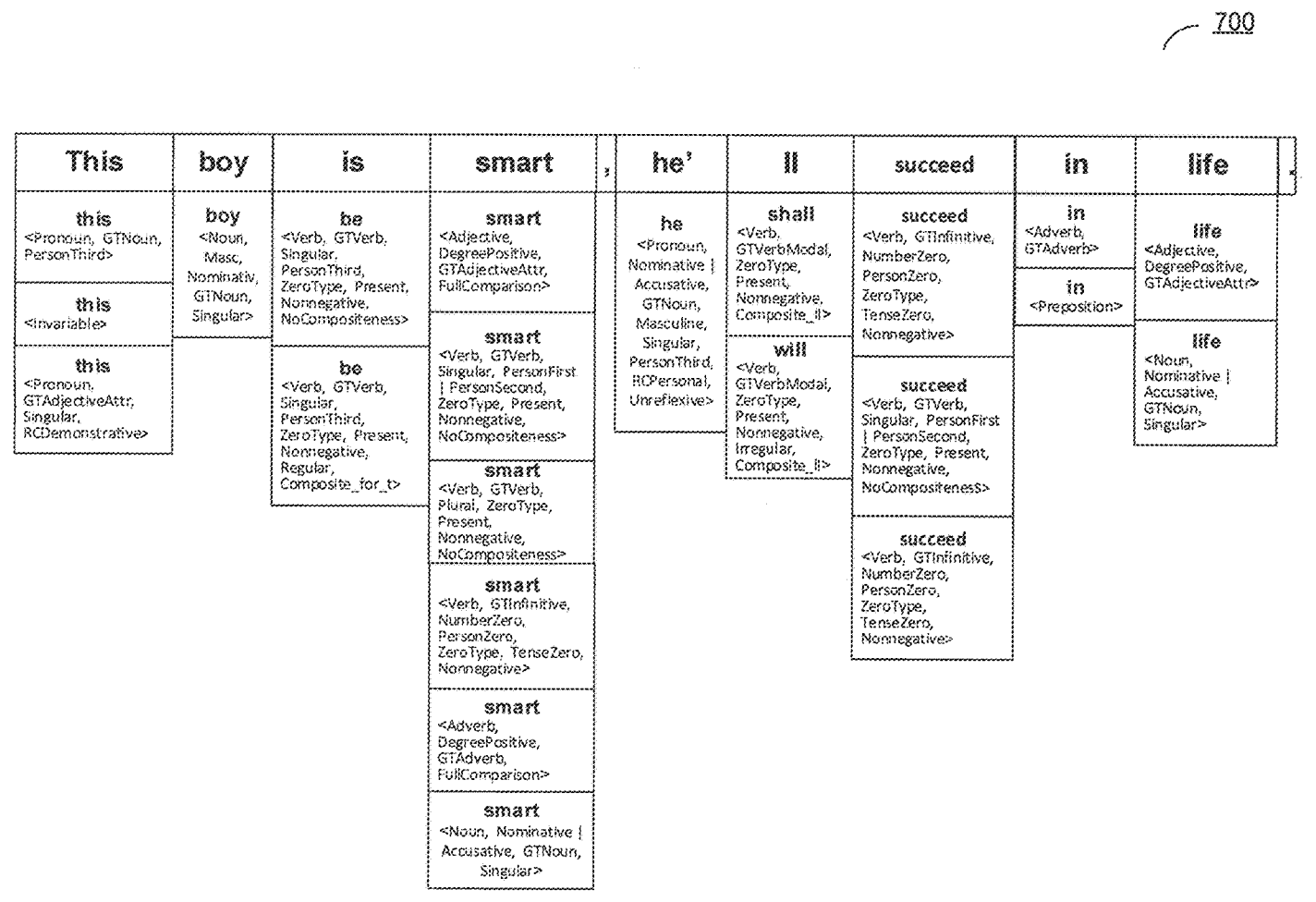

FIG. 7 schematically illustrates an example of a lexico-morphological structure of a sentence, in accordance with one or more aspects of the present disclosure. Example lexical-morphological structure 700 may comprise a plurality of "lexical meaning-grammatical value" pairs for example sentence. In an illustrative example, "ll" may be associated with lexical meaning "shall" and "will". The grammatical value associated with lexical meaning "shall" is <Verb, GTVerbModal, ZeroType, Present, Nonnegative, Composite II>. The grammatical value associated with lexical meaning "will" is <Verb, GTVerbModal, ZeroType, Present, Nonnegative, Irregular, Composite II>.

Figure 8:
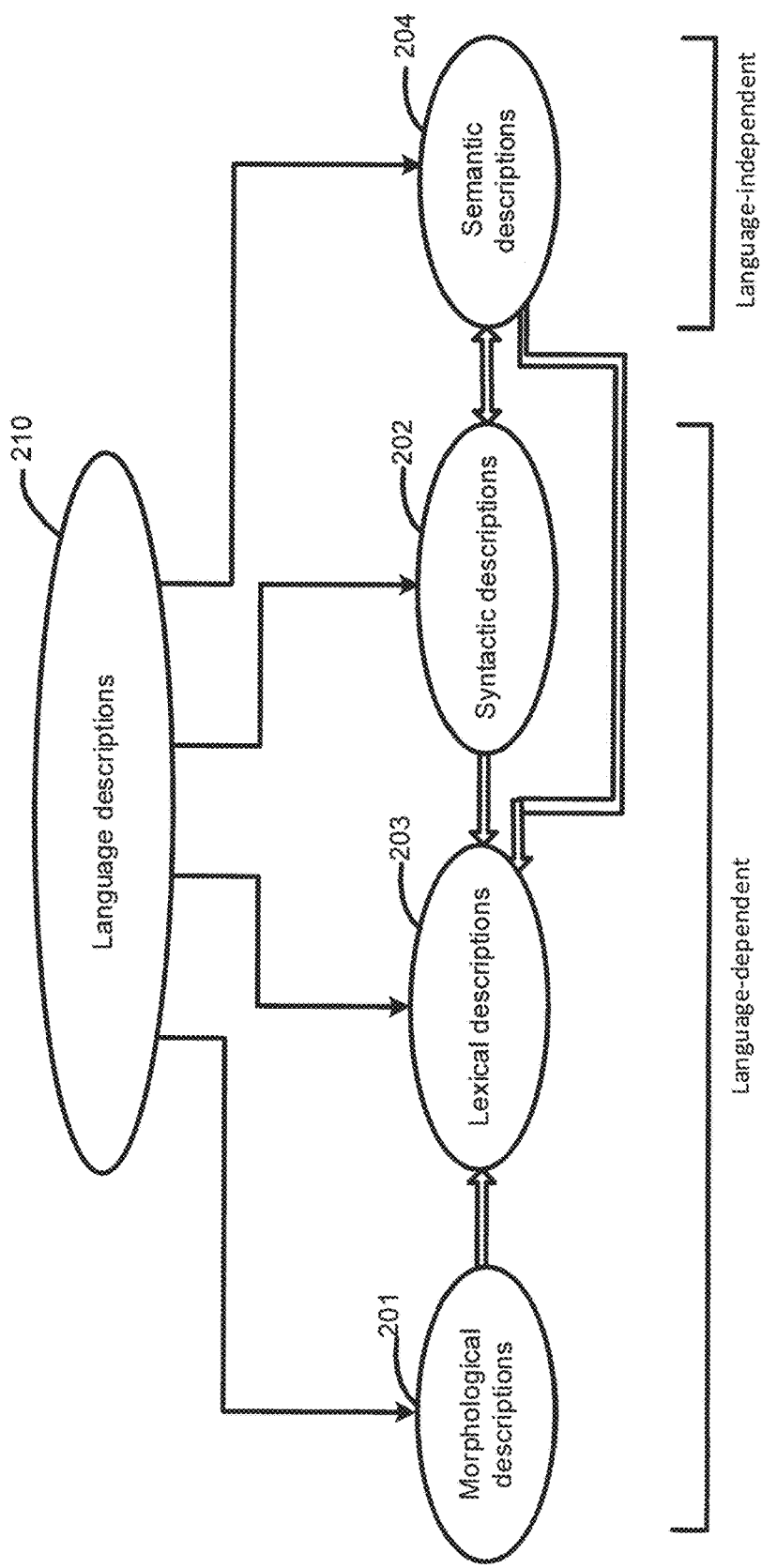
FIG. 8 schematically illustrates language descriptions representing a model of a natural language, in accordance with one or more aspects of the present disclosure.

FIG. 8 schematically illustrates language descriptions 210 including morphological descriptions 201, lexical descriptions 203, syntactic descriptions 202, and semantic descriptions 204, and their relationship thereof. Among them, morphological descriptions 201, lexical descriptions 203, and syntactic descriptions 202 are language-specific. A set of language descriptions 210 represent a model of a certain natural language.

In an illustrative example, a certain lexical meaning of lexical descriptions 203 may be associated with one or more surface models of syntactic descriptions 202 corresponding to this lexical meaning. A certain surface model of syntactic descriptions 202 may be associated with a deep model of semantic descriptions 204.

Figure 9:
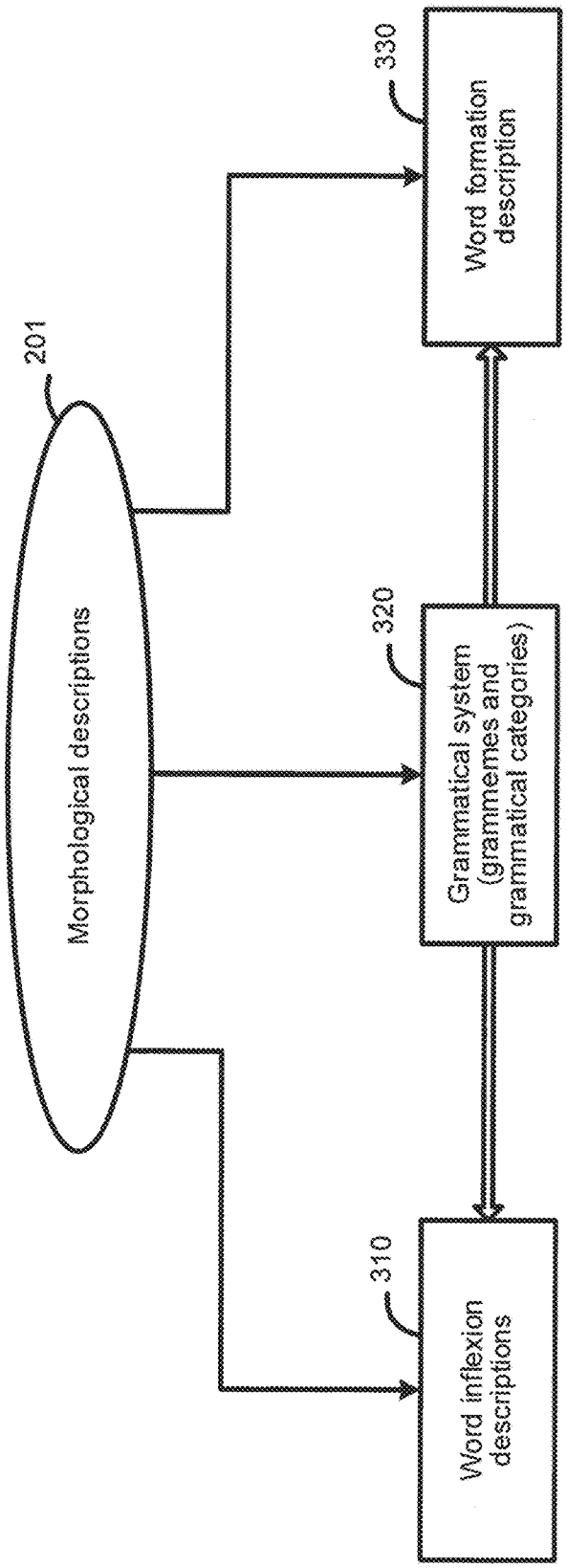
FIG. 9 schematically illustrates examples of morphological descriptions, in accordance with one or more aspects of the present disclosure.

FIG. 9 schematically illustrates several examples of morphological descriptions. Components of the morphological descriptions 201 may include: word inflexion descriptions 310, grammatical system 320, and word formation description 330, among others. Grammatical system 320 comprises a set of grammatical categories, such as, part of speech, grammatical case, grammatical gender, grammatical number, grammatical person, grammatical reflexivity, grammatical tense, grammatical aspect, and their values (also referred to as "grammemes"), including, for example, adjective, noun, or verb; nominative, accusative, or genitive case; feminine, masculine, or neutral gender; etc. The respective grammemes may be utilized to produce word inflexion description 310 and the word formation description 330.

Word inflexion descriptions 310 describe the forms of a given word depending upon its grammatical categories (e.g., grammatical case, grammatical gender, grammatical number, grammatical tense, etc.), and broadly includes or describes various possible forms of the word. Word formation description 330 describes which new words may be constructed based on a given word (e.g., compound words).

According to one aspect of the present disclosure, syntactic relationships among the elements of the original sentence may be established using a constituent model. A constituent may comprise a group of neighboring words in a sentence that behaves as a single entity. A constituent has a word at its core and may comprise child constituents at lower levels. A child constituent is a dependent constituent and may be associated with other constituents (such as parent constituents) for building the syntactic descriptions 202 of the original sentence.

Figure 10:
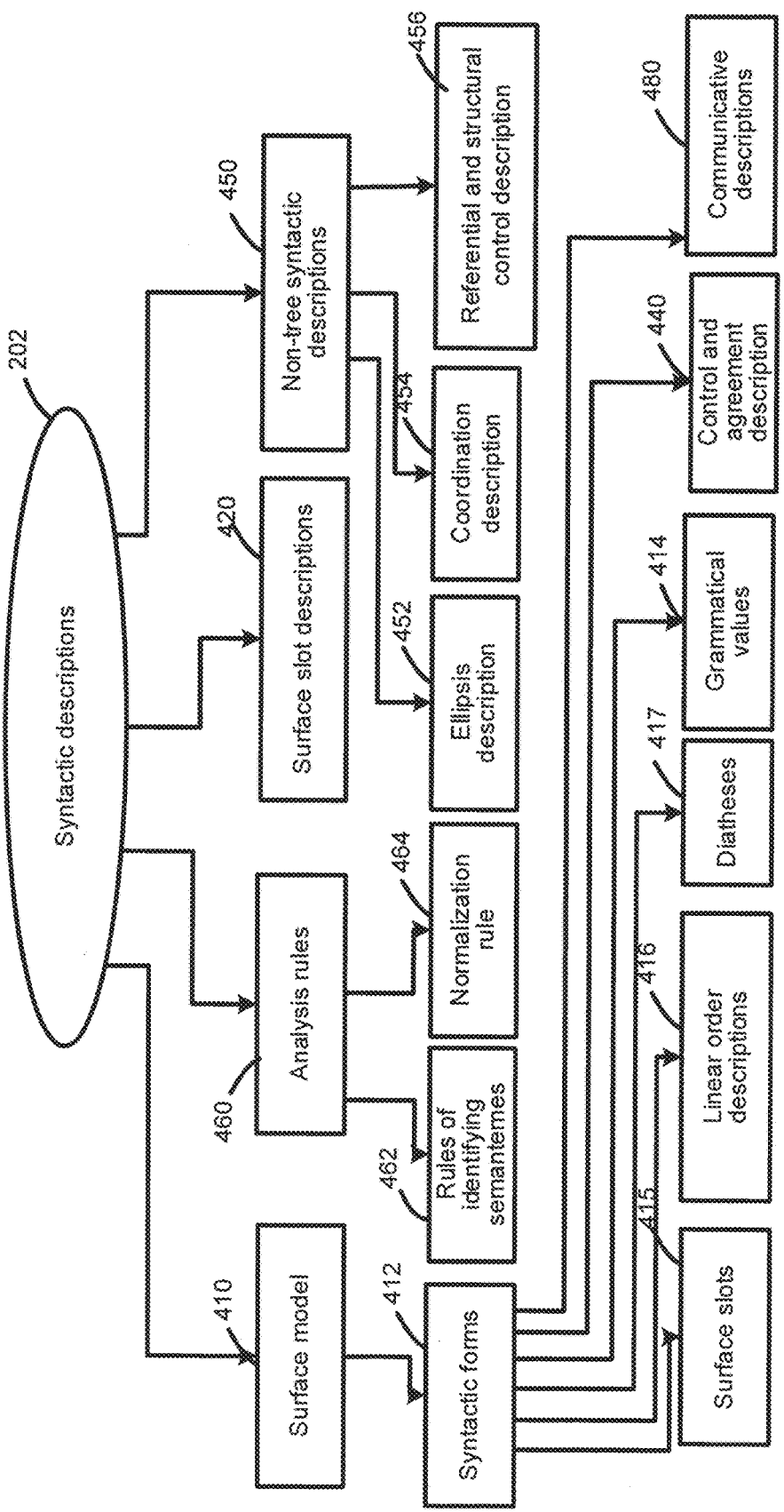
FIG. 10 schematically illustrates examples of syntactic descriptions, in accordance with one or more aspects of the present disclosure.

FIG. 10 illustrates exemplary syntactic descriptions. The components of the syntactic descriptions 202 may include, but are not limited to, surface models 410, surface slot descriptions 420, referential and structural control description 456, control and agreement description 440, non-tree syntactic description 450, and analysis rules 460. Syntactic descriptions 102 may be used to construct possible syntactic structures of the original sentence in a given natural language, taking into account free linear word order, non-tree syntactic phenomena (e.g., coordination, ellipsis, etc.), referential relationships, and other considerations.

Surface models 410 may be represented as aggregates of one or more syntactic forms ("syntforms" 412) employed to describe possible syntactic structures of the sentences that are comprised by syntactic description 102. In general, the lexical meaning of a natural language word may be linked to surface (syntactic) models 410. A surface model may represent constituents which are viable when the lexical meaning functions as the "core." A surface model may include a set of surface slots of the child elements, a description of the linear order, and/or diatheses. "Diathesis" herein shall refer to a certain relationship between an actor (subject) and one or more objects, having their syntactic roles defined by morphological and/or syntactic means. In an illustrative example, a diathesis may be represented by a voice of a verb: when the subject is the agent of the action, the verb is in the active voice, and when the subject is the target of the action, the verb is in the passive voice.

Figure 12:
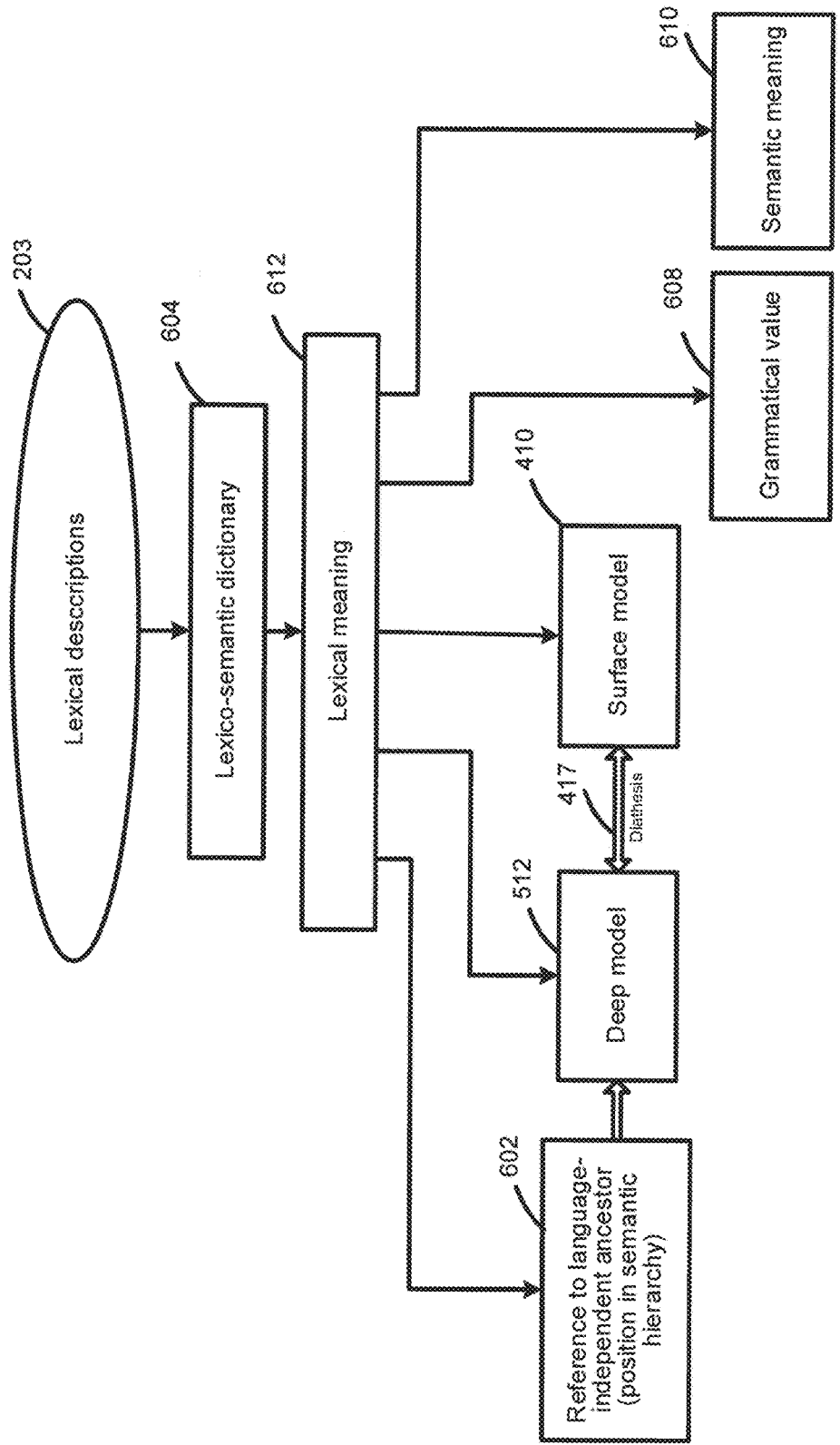
FIG. 12 schematically illustrates examples of lexical descriptions, in accordance with one or more aspects of the present disclosure.

A constituent model may utilize a plurality of surface slots 415 of the child constituents and their linear order descriptions 416 to describe grammatical values 414 of possible fillers of these surface slots. Diatheses 417 may represent relationships between surface slots 415 and deep slots 514 (as shown in FIG. 12). Communicative descriptions 480 describe communicative order in a sentence.

Linear order description 416 may be represented by linear order expressions reflecting the sequence in which various surface slots 415 may appear in the sentence. The linear order expressions may include names of variables, names of surface slots, parenthesis, grammemes, ratings, the "or" operator, etc. In an illustrative example, a linear order description of a simple sentence of "Boys play football" may be represented as "Subject Core Object_Direct," where Subject, Core, and Object_Direct are the names of surface slots 415 corresponding to the word order.

Communicative descriptions 480 may describe a word order in a syntform 412 from the point of view of communicative acts that are represented as communicative order expressions, which are similar to linear order expressions. The control and concord description 440 may comprise rules and restrictions which are associated with grammatical values of the related constituents and may be used in performing syntactic analysis.

Non-tree syntax descriptions 450 may be created to reflect various linguistic phenomena, such as ellipsis and coordination, and may be used in syntactic structures transformations which are generated at various stages of the analysis according to one or more aspects of the present disclosure. Non-tree syntax descriptions 450 may include ellipsis description 452, coordination description 454, as well as referential and structural control description 430, among others.

Analysis rules 460 may generally describe properties of a specific language and may be used in performing the semantic analysis. Analysis rules 460 may comprise rules of identifying semantemes 462 and normalization rules 464. Normalization rules 464 may be used for describing language-dependent transformations of semantic structures.

Figure 11:
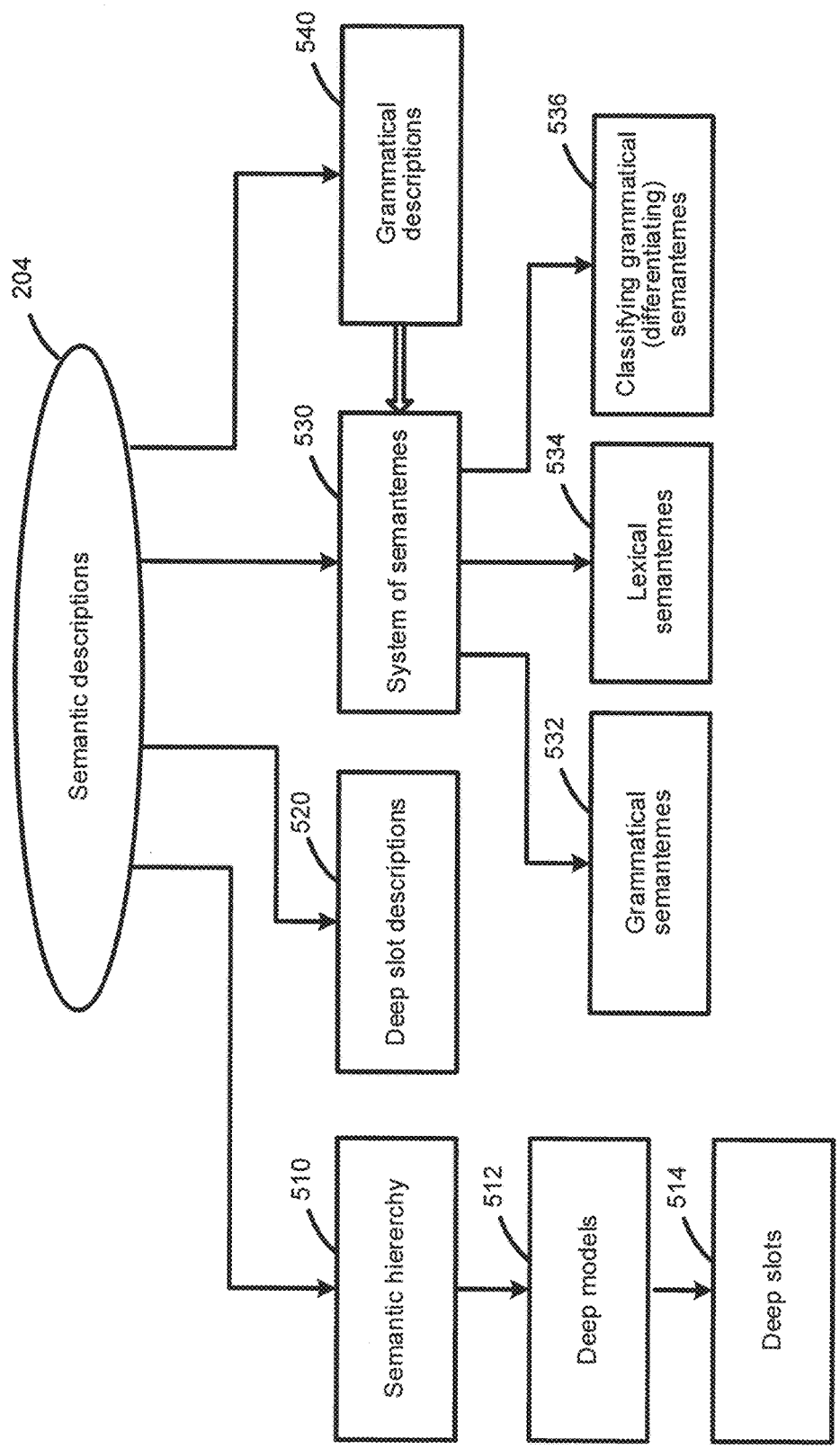
FIG. 11 schematically illustrates examples of semantic descriptions, in accordance with one or more aspects of the present disclosure.

FIG. 11 illustrates exemplary semantic descriptions. Components of semantic descriptions 204 are language-independent and may include, but are not limited to, a semantic hierarchy 510, deep slots descriptions 520, a set of semantemes 530, and pragmatic descriptions 540.

The core of the semantic descriptions may be represented by semantic hierarchy 510 which may comprise semantic notions (semantic entities) which are also referred to as semantic classes. The latter may be arranged into hierarchical structure reflecting parent-child relationships. In general, a child semantic class may inherit one or more properties of its direct parent and other ancestor semantic classes. In an illustrative example, semantic class SUBSTANCE is a child of semantic class ENTITY and the parent of semantic classes GAS, LIQUID, METAL, WOOD_MATERIAL, etc.

Each semantic class in semantic hierarchy 510 may be associated with a corresponding deep model 512. Deep model 512 of a semantic class may comprise a plurality of deep slots 514 which may reflect semantic roles of child constituents in various sentences that include objects of the semantic class as the core of the parent constituent. Deep model 512 may further comprise possible semantic classes acting as fillers of the deep slots. Deep slots 514 may express semantic relationships, including, for example, "agent," "addressee," "instrument," "quantity," etc. A child semantic class may inherit and further expand the deep model of its direct parent semantic class.

Deep slots descriptions 520 reflect semantic roles of child constituents in deep models 512 and may be used to describe general properties of deep slots 514. Deep slots descriptions 520 may also comprise grammatical and semantic restrictions associated with the fillers of deep slots 514. Properties and restrictions associated with deep slots 514 and their possible fillers in various languages may be substantially similar and often identical. Thus, deep slots 514 are language-independent.

System of semantemes 530 may represents a plurality of semantic categories and semantemes which represent meanings of the semantic categories. In an illustrative example, a semantic category "DegreeOfComparison" may be used to describe the degree of comparison and may comprise the following semantemes: "Positive," "ComparativeHigherDegree," and "SuperlativeHighestDegree," among others. In another illustrative example, a semantic category "RelationToReferencePoint" may be used to describe an order (spatial or temporal in a broad sense of the words being analyzed), such as before or after a reference point, and may comprise the semantemes "Previous" and "Subsequent.". In yet another illustrative example, a semantic category "EvaluationObjective" can be used to describe an objective assessment, such as "Bad," "Good," etc.

System of semantemes 530 may include language-independent semantic attributes which may express not only semantic properties but also stylistic, pragmatic and communicative properties. Certain semantemes may be used to express an atomic meaning which corresponds to a regular grammatical and/or lexical expression in a natural language. By their intended purpose and usage, sets of semantemes may be categorized, e.g., as grammatical semantemes 532, lexical semantemes 534, and classifying grammatical (differentiating) semantemes 536.

Grammatical semantemes 532 may be used to describe grammatical properties of the constituents when transforming a syntactic tree into a semantic structure. Lexical semantemes 534 may describe specific properties of objects (e.g., "being flat" or "being liquid") and may be used in deep slot descriptions 520 as restriction associated with the deep slot fillers (e.g., for the verbs "face (with)" and "flood," respectively). Classifying grammatical (differentiating) semantemes 536 may express the differentiating properties of objects within a single semantic class. In an illustrative example, in the semantic class of HAIRDRESSER, the semanteme of <<RelatedToMen>> is associated with the lexical meaning of "barber," to differentiate from other lexical meanings which also belong to this class, such as "hairdresser," "hairstylist," etc. Using these language-independent semantic properties that may be expressed by elements of semantic description, including semantic classes, deep slots, and semantemes, may be employed for extracting the semantic information, in accordance with one or more aspects of the present invention.

Pragmatic descriptions 540 allow associating a certain theme, style or genre to texts and objects of semantic hierarchy 510 (e.g., "Economic Policy," "Foreign Policy," "Justice," "Legislation," "Trade," "Finance," etc.). Pragmatic properties may also be expressed by semantemes. In an illustrative example, the pragmatic context may be taken into consideration during the semantic analysis phase.

FIG. 12 illustrates exemplary lexical descriptions. Lexical descriptions 203 represent a plurality of lexical meanings 612, in a certain natural language, for each component of a sentence. For a lexical meaning 612, a relationship 602 to its language-independent semantic parent may be established to indicate the location of a given lexical meaning in semantic hierarchy 510.

A lexical meaning 612 of lexical-semantic hierarchy 510 may be associated with a surface model 410 which, in turn, may be associated, by one or more diatheses 417, with a corresponding deep model 512. A lexical meaning 612 may inherit the semantic class of its parent, and may further specify its deep model 512.

A surface model 410 of a lexical meaning may comprise includes one or more syntforms 412. A syntform, 412 of a surface model 410 may comprise one or more surface slots 415, including their respective linear order descriptions 416, one or more grammatical values 414 expressed as a set of grammatical categories (grammemes), one or more semantic restrictions associated with surface slot fillers, and one or more of the diatheses 417. Semantic restrictions associated with a certain surface slot filler may be represented by one or more semantic classes, whose objects can fill the surface slot.

Figure 13:
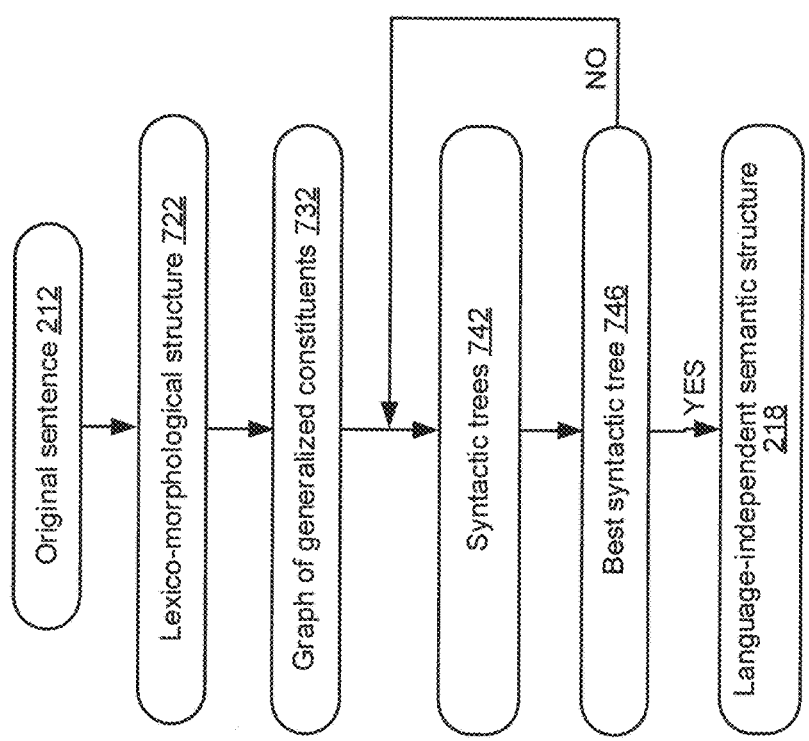
FIG. 13 schematically illustrates example data structures that may be employed by one or more methods implemented in accordance with one or more aspects of the present disclosure.

FIG. 13 schematically illustrates example data structures that may be employed by one or more methods described herein. Referring again to FIG. 6, at block 214, the computer system implementing the method may perform lexico-morphological analysis of sentence 212 to produce a lexico-morphological structure 722 of FIG. 13. Lexico-morphological structure 722 may comprise a plurality of mapping of a lexical meaning to a grammatical value for each lexical unit (e.g., word) of the original sentence. FIG. 7 schematically illustrates an example of a lexico-morphological structure.

Referring again to FIG. 6, at block 215, the computer system may perform a rough syntactic analysis of original sentence 212, in order to produce a graph of generalized constituents 732 of FIG. 13. Rough syntactic analysis involves applying one or more possible syntactic models of possible lexical meanings to each element of a plurality of elements of the lexico-morphological structure 722, in order to identify a plurality of potential syntactic relationships within original sentence 212, which are represented by graph of generalized constituents 732.

Graph of generalized constituents 732 may be represented by an acyclic graph comprising a plurality of nodes corresponding to the generalized constituents of original sentence 212, and further comprising a plurality of edges corresponding to the surface (syntactic) slots, which may express various types of relationship among the generalized lexical meanings. The method may apply a plurality of potentially viable syntactic models for each element of a plurality of elements of the lexico-morphological structure of original sentence 212 in order to produce a set of core constituents of original sentence 212. Then, the method may consider a plurality of viable syntactic models and syntactic structures of original sentence 212 in order to produce graph of generalized constituents 732 based on a set of constituents. Graph of generalized constituents 732 at the level of the surface model may reflect a plurality of viable relationships among the words of original sentence 212. As the number of viable syntactic structures may be relatively large, graph of generalized constituents 732 may generally comprise redundant information, including relatively large numbers of lexical meaning for certain nodes and/or surface slots for certain edges of the graph.

Graph of generalized constituents 732 may be initially built as a tree, starting with the terminal nodes (leaves) and moving towards the root, by adding child components to fill surface slots 415 of a plurality of parent constituents in order to reflect all lexical units of original sentence 212.

Figure 14:
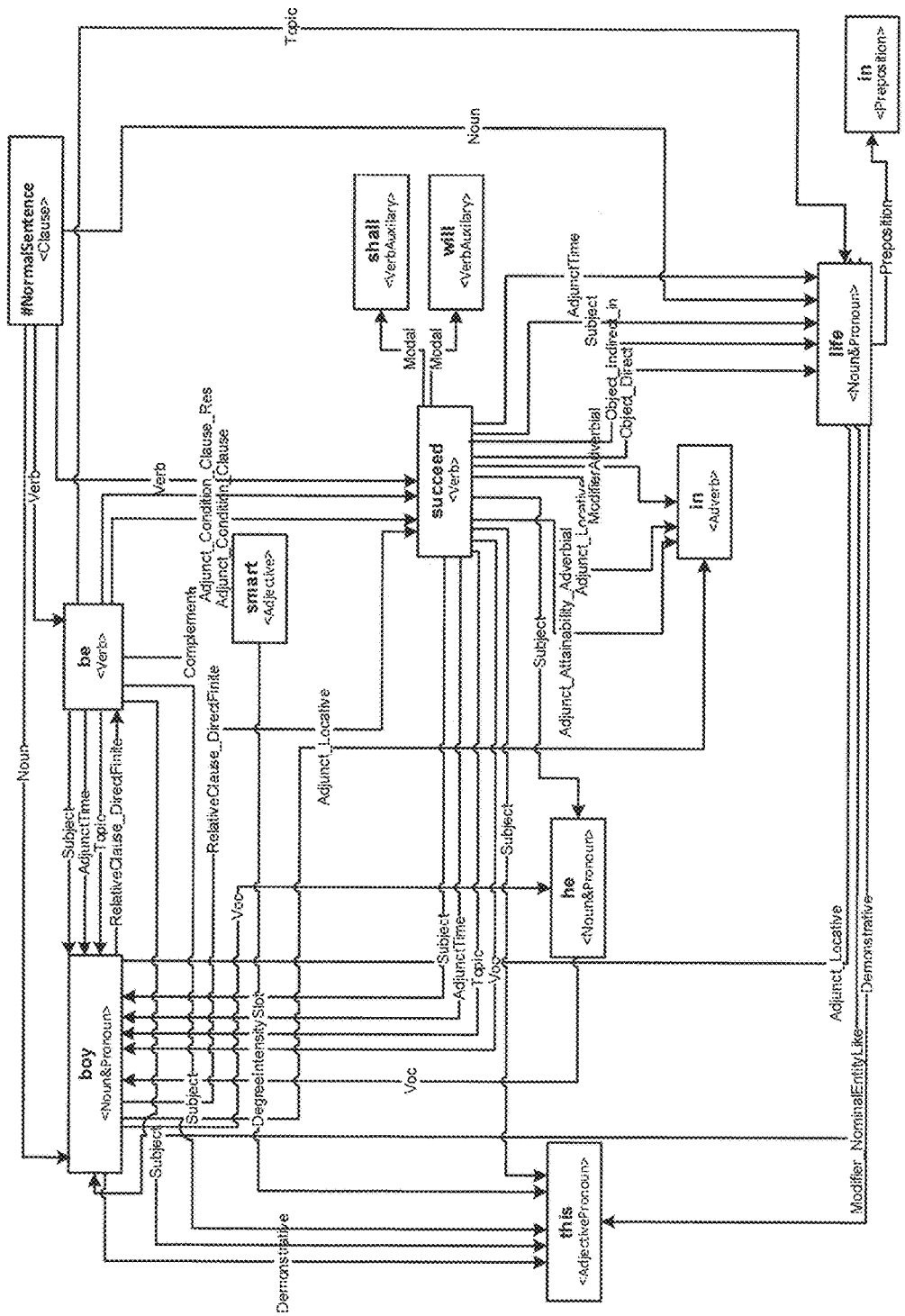
FIG. 14 schematically illustrates an example graph of generalized constituents, in accordance with one or more aspects of the present disclosure.

In certain implementations, the root of graph of generalized constituents 732 represents a predicate. In the course of the above described process, the tree may become a graph, as certain constituents of a lower level may be included into one or more constituents of an upper level. A plurality of constituents that represent certain elements of the lexico-morphological structure may then be generalized to produce generalized constituents. The constituents may be generalized based on their lexical meanings or grammatical values 414, e.g., based on part of speech designations and their relationships. FIG. 14 schematically illustrates an example graph of generalized constituents.

Referring again to FIG. 6, at block 216, the computer system may perform a precise syntactic analysis of sentence 212, to produce one or more syntactic trees 742 of FIG. 13 based on graph of generalized constituents 732. For each of one or more syntactic trees, the computer system may determine a general rating based on certain calculations and a priori estimates. The tree having the optimal rating may be selected for producing the best syntactic structure 746 of original sentence 212.

In the course of producing the syntactic structure based on the selected syntactic tree, the computer system may establish one or more non-tree links (e.g., by producing redundant path between at least two nodes of the graph). If that process fails, the computer system may select a syntactic tree having a suboptimal rating closest to the optimal rating, and may attempt to establish one or more non-tree relationships within that tree. Finally, the precise syntactic analysis produces a syntactic structure which represents the best syntactic structure corresponding to original sentence 212. In fact, selecting the best syntactic structure also produces the best lexical values 240 of original sentence 212.

At block 217, the computer system may process the syntactic trees to produce a semantic structure 218 corresponding to sentence 212. Semantic structure 218 may reflect, in language-independent terms, the semantics conveyed by original sentence. Semantic structure 218 may be represented by an acyclic graph (e.g., a tree complemented by at least one non-tree link, such as an edge producing a redundant path among at least two nodes of the graph). The original natural language words are represented by the nodes corresponding to language-independent semantic classes of semantic hierarchy 510. The edges of the graph represent deep (semantic) relationships between the nodes. Semantic structure 218 may be produced based on analysis rules 460, and may involve associating, one or more attributes (reflecting lexical, syntactic, and/or semantic properties of the words of original sentence 212) with each semantic class.

Figure 15:
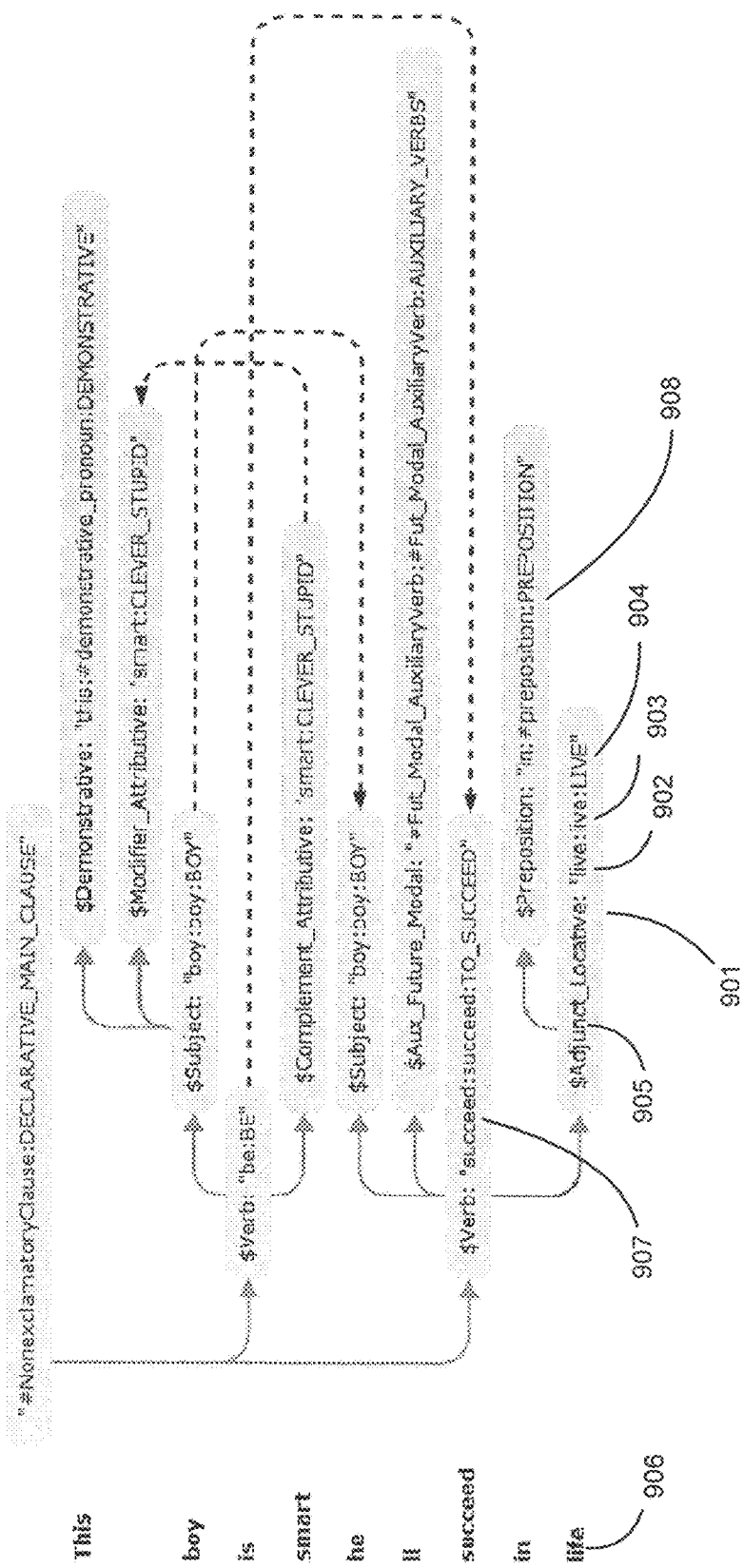
FIG. 15 illustrates an example syntactic structure corresponding to the sentence illustrated by FIG. 14.

FIG. 15 illustrates an example syntactic structure of a sentence derived from the graph of generalized constituents illustrated by FIG. 14. Node 901 corresponds to the lexical element "life" 906 in original sentence 212. By applying the method of syntactico-semantic analysis described herein, the computer system may establish that lexical element "life" 906 represents one of the lexemes of a derivative form "live" 902 associated with a semantic class "LIVE" 904, and fills in a surface slot $Adjunctr_Locative (905) of the parent constituent, which is represented by a controlling node $Verb:succeed:succeed:TO_SUCCEED (907).

Figure 16:
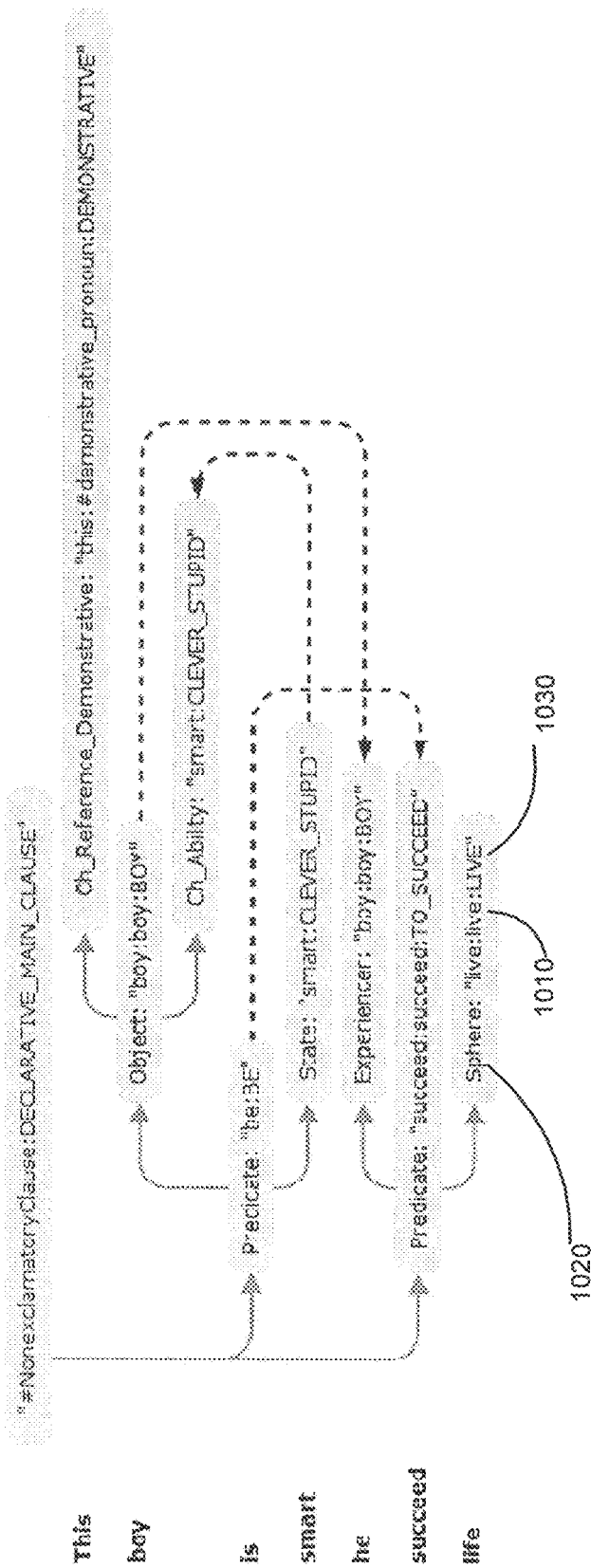
FIG. 16 illustrates a semantic structure corresponding to the syntactic structure of FIG. 15.

FIG. 16 illustrates a semantic structure corresponding to the syntactic structure of FIG. 15. With respect to the above referenced lexical element "life" 906 of FIG. 15, the semantic structure comprises lexical class 1010 and semantic classes 1030 similar to those of FIG. 15, but instead of surface slot 905, the semantic structure comprises a deep slot "Sphere" 1020.

In accordance with one or more aspects of the present disclosure, the computer system implementing the methods described herein may index one or more parameters yielded by the semantico-syntactic analysis. Thus, the methods described herein allow considering not only the plurality of words comprised by the original text corpus, but also pluralities of lexical meanings of those words, by storing and indexing all syntactic and semantic information produced in the course of syntactic and semantic analysis of each sentence of the original text corpus. Such information may further comprise the data produced in the course of intermediate stages of the analysis, the results of lexical selection, including the results produced in the course of resolving the ambiguities caused by homonymy and/or coinciding grammatical forms corresponding to different lexico-morphological meanings of certain words of the original language.

One or more indexes may be produced for each semantic structure. An index may be represented by a memory data structure, such as a table, comprising a plurality of entries. Each entry may represent a mapping of a certain semantic structure element (e.g., one or more words, a syntactic relationship, a morphological, lexical, syntactic or semantic property, or a syntactic or semantic structure) to one or more identifiers (or addresses) of occurrences of the semantic structure element within the original text.

In certain implementations, an index may comprise one or more values of morphological, syntactic, lexical, and/or semantic parameters. These values may be produced in the course of the two-stage semantic analysis, as described in more detail herein. The index may be employed in various natural language processing tasks, including the task of performing semantic search.

The computer system implementing the method may extract a wide spectrum of lexical, grammatical, syntactic, pragmatic, and/or semantic characteristics in the course of performing the syntactico-semantic analysis and producing semantic structures. In an illustrative example, the system may extract and store certain lexical information, associations of certain lexical units with semantic classes, information regarding grammatical forms and linear order, information regarding syntactic relationships and surface slots, information regarding the usage of certain forms, aspects, tonality (e.g., positive and negative), deep slots, non-tree links, semantemes, etc.

The computer system implementing the methods described herein may produce, by performing one or more text analysis methods described herein, and index any one or more parameters of the language descriptions, including lexical meanings, semantic classes, grammemes, semantemes, etc. Semantic class indexing may be employed in various natural language processing tasks, including semantic search, classification, clustering, text filtering, etc. Indexing lexical meanings (rather than indexing words) allows searching not only words and forms of words, but also lexical meanings, i.e., words having certain lexical meanings. The computer system implementing the methods described herein may also store and index the syntactic and semantic structures produced by one or more text analysis methods described herein, for employing those structures and/or indexes in semantic search, classification, clustering, and document filtering.

Figure 17:
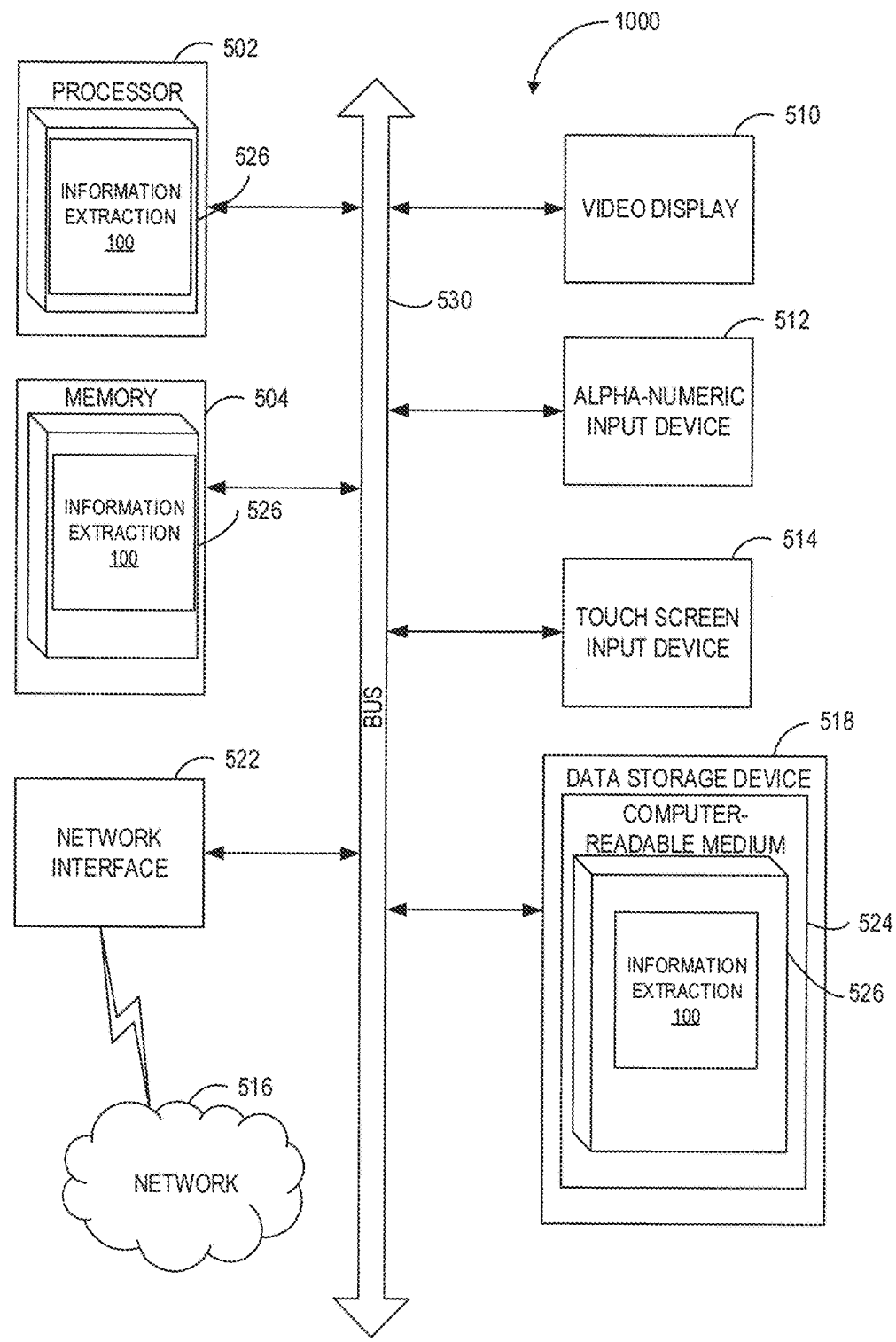
FIG. 17 depicts a diagram of an example computer system implementing the methods described herein.

FIG. 17 illustrates a diagram of an example computer system 1000 which may execute a set of instructions for causing the computer system to perform any one or more of the methods discussed herein. The computer system may be connected to other computer system in a LAN, an intranet, an extranet, or the Internet. The computer system may operate in the capacity of a server or a client computer system in client-server network environment, or as a peer computer system in a peer-to-peer (or distributed) network environment. The computer system may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methodologies discussed herein.

Exemplary computer system 1000 includes a processor 502, a main memory 504 (e.g., read-only memory (ROM) or dynamic random access memory (DRAM)), and a data storage device 518, which communicate with each other via a bus 530.

Processor 502 may be represented by one or more general-purpose computer systems such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose computer systems such as an application specific integrated circuit (ASIC), a field programmable gate array (FPGA), a digital signal processor (DSP), network processor, or the like. Processor 502 is configured to execute instructions 526 for performing the operations and functions discussed herein.

Computer system 1000 may further include a network interface device 522, a video display unit 510, a character input device 512 (e.g., a keyboard), and a touch screen input device 514.

Data storage device 518 may include a computer-readable storage medium 524 on which is stored one or more sets of instructions 526 embodying any one or more of the methodologies or functions described herein. Instructions 526 may also reside, completely or at least partially, within main memory 504 and/or within processor 502 during execution thereof by computer system 1000, main memory 504 and processor 502 also constituting computer-readable storage media. Instructions 526 may further be transmitted or received over network 516 via network interface device 522.

In certain implementations, instructions 526 may include instructions of method 100 for information extraction from natural language texts using a combination of classifier models, in accordance with one or more aspects of the present disclosure. While computer-readable storage medium 524 is shown in the example of FIG. 11 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining," "computing," "calculating," "obtaining," "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
    performing, by a computer system, syntactico-semantic analysis of a natural language text;
    processing, by the computer system, based on a first classifier model, a first plurality of classification attributes derived from a plurality of syntactico-semantic structures produced by the syntactico-semantic analysis, wherein the first classifier model identifies a plurality of core constituents, wherein each core constituent is associated with an information object of a specified ontology class;
    processing, by the computer system, based on a second classifier model, a second plurality of classification attributes derived from the syntactico-semantic structures, wherein the second classifier model identifies a plurality of child constituents of each of the plurality of core constituents;
    identifying a plurality of spans, wherein each span of the plurality of spans includes a core constituent of the plurality of core constituents and further includes the identified child constituents of the core constituent; and
    processing, by the computer system, based on a third classifier model, a third plurality of classification attributes derived from the syntactico-semantic structures, wherein the third classifier model determines whether a first span of the plurality of spans and a second span of the plurality of spans represent information object attributes that are associated with a same information object.

2. The method of claim 1, further comprising:
    utilizing, for performing a natural language processing task, the information object attributes associated with the first span and the second span.

3. The method of claim 1, further comprising:
    displaying, in visual association with a first projection of the first span and a second projection of the second span in the natural language text, the information object attributes associated with the first span and the second span; and
    accepting user input to perform at least one of: confirming the information object attributes or modifying the information object attributes.

4. The method of claim 1, wherein each syntacitco-semantic structure of the plurality of syntacitco-semantic structures is represented by a graph comprising a plurality of nodes corresponding to a plurality of semantic classes and a plurality of edges corresponding to a plurality of semantic relationships.

5. The method of claim 1, further comprising:
    determining, using a training data set, a parameter of the first classifier model, wherein the training data set comprises an annotated natural language text comprising a plurality of textual annotations, wherein each textual annotation is associated with an information object attribute of an information object of a known category.

6. The method of claim 1, wherein the first classifier model yields a value representing a likelihood of a candidate node representing a core constituent of a span that represents an attribute of an information object of the specified ontology class.

7. The method of claim 1, wherein the first plurality of classification attributes include attributes of a candidate core constituent and at least one of: a parent node of the candidate core constituent, a child node of the candidate core constituent, or a sibling node of the candidate core constituent.

8. The method of claim 1, wherein the second classifier model yields a value representing a likelihood of a candidate child constituent belonging to a span associated with a specified core constituent.

9. The method of claim 1, wherein the second plurality of classification attributes include attributes of a candidate child constituent and at least one of: a parent node of the candidate child constituent, a child node of the candidate child constituent, or a sibling node of the candidate child constituent.

10. The method of claim 1, wherein the third classifier model yields a value representing a likelihood of the first span and the second span being associated with the same information object.

11. The method of claim 1, wherein the third plurality of classification attributes include attributes of nodes of the first span and attributes of nodes of the second span.

12. The method of claim 1, further comprising:
    producing the first plurality of classification attributes by traversing, according to a pre-defined traversal path, at least one syntactico-semantic structure of the plurality of syntactico-semantic structures, wherein the traversal path specifies a plurality of nodes whose attributes are to be included into the first plurality of classification attributes.

13. A system, comprising:
    a memory;
    a processor, coupled to the memory, the processor configured to:
        perform syntactico-semantic analysis of a natural language text;

process, based on a first classifier model, a first plurality of classification attributes derived from a plurality of syntactico-semantic structures produced by the syntactico-semantic analysis, wherein the first classifier model identifies a plurality of core constituents, wherein each core constituent is associated with an information object of a specified ontology class;

process, based on a second classifier model, a second plurality of classification attributes derived from the syntactico-semantic structures, wherein the second classifier model identifies a plurality of child constituents of each of the plurality of core constituents;

identify a plurality of spans, wherein each span of the plurality of spans includes a core constituent of the plurality of core constituents and further includes the identified child constituents of the core constituent; and process, based on a third classifier model, a third plurality of classification attributes derived from the syntactico-semantic structures, wherein the third classifier model determines whether a first span of the plurality of spans and a second span of the plurality of spans represent information object attributes that are associated with a same information object.

14. The system of claim 13, wherein the processor is further configured to:
utilize, for performing a natural language processing task, the information object attributes associated with the first span and the second span.

15. The system of claim 13, wherein the first classifier model yields a value representing a likelihood of a candidate node representing a core constituent of a span that represents an attribute of an information object of the specified ontology class.

16. The system of claim 13, wherein the second classifier model yields a value representing a likelihood of a candidate child constituent belonging to a span associated with a specified core constituent.

17. The system of claim 13, wherein the third classifier model yields a value representing a likelihood of the first span and the second span being associated with the same information object.

18. A computer-readable non-transitory storage medium comprising executable instructions that, when executed by a computer system, cause the computer system to:
perform syntactico-semantic analysis of a natural language text;
process, based on a first classifier model, a first plurality of classification attributes derived from a plurality of syntactico-semantic structures produced by the syntactico-semantic analysis, wherein the first classifier model identifies a plurality of core constituents, wherein each core constituent is associated with an information object of a specified ontology class;
process, based on a second classifier model, a second plurality of classification attributes derived from the syntactico-semantic structures, wherein the second classifier model identifies a plurality of child constituents of each of the plurality of core constituents;
identify a plurality of spans, wherein each span of the plurality of spans includes a core constituent of the plurality of core constituents and further includes the identified child constituents of the core constituent; and
process, based on a third classifier model, a third plurality of classification attributes derived from the syntactico-semantic structures, wherein the third classifier model determines whether a first span of the plurality of spans and a second span of the plurality of spans represent information object attributes that are associated with a same information object.

19. The computer-readable non-transitory storage medium of claim 18, further comprising executable instructions to cause the computer system to:
utilize, for performing a natural language processing task, the information object attributes associated with the first span and the second span.

20. The computer-readable non-transitory storage medium of claim 18, further comprising executable instructions to cause the computer system to:
determine, using a training data set, a parameter of the first classifier model, wherein the training data set comprises an annotated natural language text comprising a plurality of textual annotations, wherein each textual annotation is associated with an information object attribute of an information object of a known category.

* * * * *